US012574184B2

(12) United States Patent
Gao et al.

(10) Patent No.:     US 12,574,184 B2
(45) Date of Patent:     Mar. 10, 2026

(54) REMAINING MINIMUM SYSTEM INFORMATION COMMUNICATION METHOD AND RELATED APPARATUS

(71) Applicant: Huawei Technologies Co., Ltd., Shenzhen (CN)

(72) Inventors: Kuandong Gao, Chengdu (CN); Huang Huang, Shenzhen (CN); Mao Yan, Chengdu (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 18/126,635

(22) Filed: Mar. 27, 2023

(65) Prior Publication Data

US 2023/0239115 A1     Jul. 27, 2023

Related U.S. Application Data

(63) Continuation of application No. 16/875,307, filed on May 15, 2020, now Pat. No. 11,616,624, which is a
(Continued)

(30) Foreign Application Priority Data

Nov. 17, 2017    (CN) .......................... 201711148422.3

(51) Int. Cl.
  H04L 5/00          (2006.01)
  H04L 27/26        (2006.01)
  (Continued)

(52) U.S. Cl.
  CPC ........ H04L 5/0053 (2013.01); H04L 27/2657 (2013.01); H04W 72/0446 (2013.01); H04W 72/23 (2023.01)

(58) Field of Classification Search
  CPC .............. H04W 72/23; H04W 72/0446; H04L 27/2675; H04L 5/0053
  (Continued)

(56) References Cited

U.S. PATENT DOCUMENTS 11,616,624 B2 *    3/2023    Gao ...................... H04W 72/23
                                                                370/329
2018/0279241 A1    9/2018    Lee et al.
  (Continued)

FOREIGN PATENT DOCUMENTS

CN          107113261 A      8/2017
CN          104904300 B     10/2019
  (Continued)

OTHER PUBLICATIONS

NTT Docomo, Inc., "Discussion on remaining details on RMSI delivery," 3GPP TSG RAN WG1 Meeting NR#3, Nagoya, Japan, Sep. 18-21, 2017, R1-1716071, 5 pages.
(Continued)

*Primary Examiner* — Peter G Solinsky
(74) *Attorney, Agent, or Firm* — Slater Matsil, LLP

(57)          ABSTRACT

A communication method and a related apparatus. The communication method includes determining, based on a starting location of a first remaining minimum system information RMSI detection window and a time index of a synchronization signal (SS)/physical broadcast channel (PBCH) block, a starting location of an RMSI detection window corresponding to a terminal device, where a value of the starting location of the RMSI detection window is one of four possible values of the starting location of the RMSI detection window, and receiving the RMSI based on the starting location of the RMSI detection window.

31 Claims, 4 Drawing Sheets

A network device determines, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window in an RMSI detection period and a first RMSI detection window in the RMSI detection period and based on the reference location of the RMSI detection window in the RMSI detection period     ⌐ S710

The network device sends RMSI based on the location of the RMSI detection window     ⌐ S720

Related U.S. Application Data continuation of application No. PCT/CN2018/116181, filed on Nov. 19, 2018.

(51) Int. Cl.
H04W 72/0446 (2023.01)
H04W 72/23 (2023.01)

(58) Field of Classification Search
USPC ........................................................ 370/329
See application file for complete search history.

(56) References Cited

U.S. PATENT DOCUMENTS

| | | | |
|---|---|---|---|
| 2019/0132882 A1 | 5/2019 | Li et al. | |
| 2019/0230696 A1 | 7/2019 | Kim et al. | |
| 2020/0187093 A1 | 6/2020 | Awad | |
| 2020/0351853 A1 | 11/2020 | Xiong et al. | |

FOREIGN PATENT DOCUMENTS

| | | |
|---|---|---|
| GB | 201709679 | 8/2017 |
| WO | 2013163498 A2 | 10/2013 |

OTHER PUBLICATIONS

"3rd Generation Partnership Project; Technical Specification Group Radio Access Network; NR; Physical Channels and Modulation (Release 15)," 3GPP TS 38.211 V1.0.0, Sep. 2017, 37 pages.

"3rd Generation Partnership Project; Technical Specification Group Radio Access Network; NR; Physical Layer Procedures for Control (Release 15)," 3GPP TS 38.213 V.1.1.0, Oct. 2017, 21 pages.

3rd Generation Partnership Project; Technical Specification Group Radio Access Network; NR; Radio Resource Control (RRC); Protocol specification (Release 15), 3GPP TS 38.331 V0.1.0, Oct. 2017, 42 pages.

"3rd Generation Partnership Project; Technical Specification Group Radio Access Network; NR; Physical channels and modulation (Release 15)," 3GPP TS 38.211 V1.1.0 1, Oct. 2017, 81 pages.

"3rd Generation Partnership Project; Technical Specification Group Radio Access Network; NR; Physical Layer Procedures for Control (Release 15)," 3GPP TS 38.213 V1.0.0, Sep. 2017, 16 pages.

"Discussion on SS periodicity for NR," Source: NTT Docomo, Inc., Agenda Item: 8.1.1.1.4, Document for: Discussion and Decision, 3GPP TSG RAN WG1 Meeting #88bis, R1-1705707, Apr. 3-7, 2017, 4 pages.

"Remaining Details of RMSI," Source: ZTE, Sanechips, Agenda Item: 6.1.2.2, Document for: Discussion and Decision, 3GPP TSG RAN WG1 Meeting NR#3, R1-1715378, Sep. 18-21, 2017, 14 pages.

"Coexistence of Different UE Types on a Wideband Carrier," Agenda Item: 6.3.5, Source: Huawei, HiSilicon, Document for: Discussion and Decision, 3GPP TSG RAN WG1 Meeting NR#3, R1-1715570, Sep. 18-21, 2017, 8 pages.

"Remaining Details on Remaining Minimum System Information Delivery," Agenda Item: 6.1.2.2, Source: Samsung, Document for: Discussion and Decision, 3GPP TSG RAN WG1 Meeting NR#3, R1-1715910, Sep. 18-21, 2017, 7 pages.

"Discussion on Remaining Minimum System Information," Source: vivo, Agenda Item: 7.1.2.2, Document for: Discussion and Decision, 3GPP TSG RAN WG1 Meeting #90bis, R1-1717461, Oct. 9-13, 2017, 15 pages.

"Discussion on Remaining Details on RMSI Delivery," Source: NTT Docomo, Inc., Agenda Item: 7.1.2.2, Document for: Discussion and Decision, 3GPP TSG RAN WG1 Meeting 90bis, R1-1718181, Prague, CZ, Oct. 9-13, 2017, 7 pages.

"Remaining System Information Delivery Consideration," Agenda item: 7.1.2., Source: Qualcomm Incorporated, Document for: Discussion/Decision, 3GPP TSG RAN WG1 Meeting 90bis, R1-1718528, Oct. 9-13, 2017, 9 pages.

"Remaining Details on Remaining Minimum System Information," Agenda item: 7.1.2.2, Source: Nokia, Nokia Shanghai Bell, Document for: Discussion and Decision, 3GPP TSG-RAN WG1 NR AH#3, R1-1718613, Oct. 9-13, 2017, 9 pages.

3rd Generation Partnership Project; Technical Specification Group Radio Access Network; NR; Multiplexing and channel coding (Release 15), 3GPP TS 38.212 V1.0.0 (Sep. 2017), total 28 pages.

3rd Generation Partnership Project; Technical Specification Group Radio Access Network; NR; User Equipment (UE) radio access capabilities (Release 15), 3GPP TS 38.306 V15.6.0 (Jun. 2019), total 53 pages.

* cited by examiner

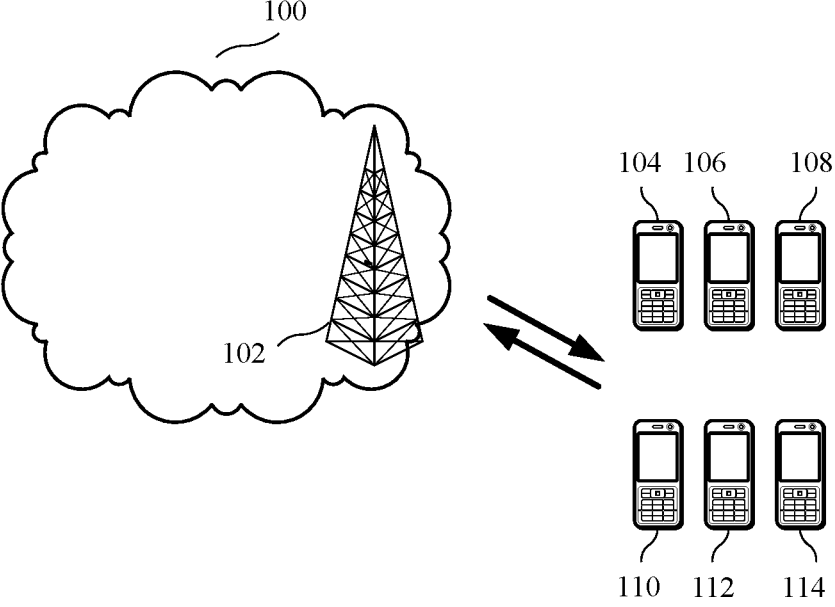

FIG. 1

| A terminal device determines, based on offset information, a time index of an RMSI detection window corresponding to the terminal device, and duration of the RMSI detection window corresponding to the terminal device, a location of the RMSI detection window corresponding to the terminal device, where the offset information is determined based on an offset between a reference location of the RMSI detection window in an RMSI detection period and a first RMSI detection window in the RMSI detection period and based on the reference location of the RMSI detection window in the RMSI detection period | S210 |
|---|---|
| The terminal device receives RMSI based on the location of the RMSI detection window | S220 |

FIG. 2

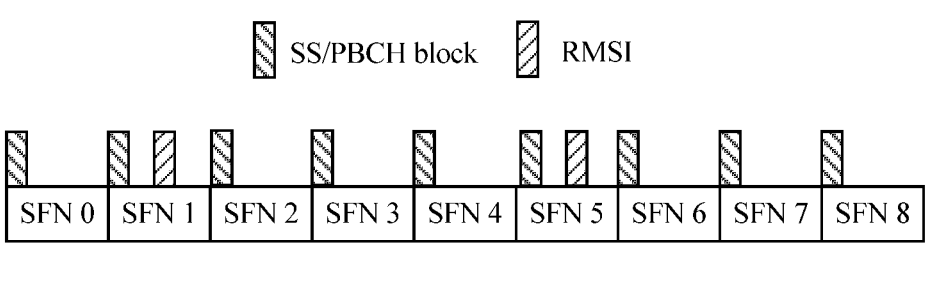

FIG. 6

A network device determines, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window in an RMSI detection period and a first RMSI detection window in the RMSI detection period and based on the reference location of the RMSI detection window in the RMSI detection period      S710

The network device sends RMSI based on the location of the RMSI detection window      S720

FIG. 7

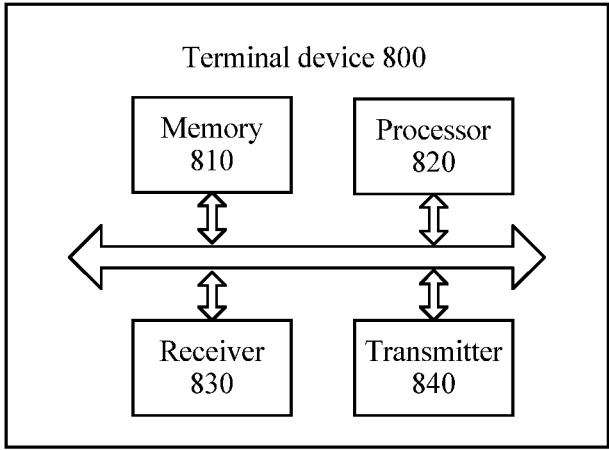

FIG. 8

REMAINING MINIMUM SYSTEM INFORMATION COMMUNICATION METHOD AND RELATED APPARATUS

CROSS-REFERENCE TO RELATED APPLICATIONS

This application is a continuation of U.S. patent application Ser. No. 16/875,307, filed on May 15, 2020, now U.S. Pat. No. 11,616,624 issuing Mar. 28, 2023, which is a continuation of International Application No. PCT/CN2018/116181, filed on Nov. 19, 2018, which claims priority to Chinese Patent Application No. 201711148422.3, filed on Nov. 17, 2017. All of the afore-mentioned patent applications are hereby incorporated by reference in their entireties.

TECHNICAL FIELD

This application relates to the communications field, and more specifically, to a remaining minimum system information (RMSI) communication method, a terminal device, a network device, and a computer readable storage medium.

BACKGROUND

It is proposed in the prior art that RMSI transmission in new radio (NR) is configured based on a small window. In other words, it is proposed in the prior art that RMSI can be detected based on a small window. However, how to detect RMSI based on a small window is not further provided in the prior art. Therefore, an RMSI communication method needs to be proposed.

SUMMARY

This application provides an RMSI communication method and a related apparatus, to transmit RMSI.

According to a first aspect, this application provides an RMSI communication method. The method includes determining, by a terminal device based on offset information, a time index of an RMSI detection window corresponding to the terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period, and receiving, by the terminal device, the RMSI based on the location of the RMSI detection window.

In this communication method, the terminal device can learn of the location of the RMSI detection window and receive the RMSI in the RMSI detection window.

In a possible design, the first RMSI detection window is an RMSI detection window corresponding to a synchronization signal (SS)/physical broadcast channel (PBCH) block whose time index is 0.

In a possible design, the reference location of the detection window in the RMSI detection period is determined based on the first system frame in the RMSI detection period and/or time information of the first system frame.

In a possible design, the time information of the first system frame is the first subframe of the first system frame or the first slot of the first system frame.

In a possible design, a reference location of a detection window set in the RMSI detection period is determined based on a location of an SS/PBCH block whose time index is 0 in an SS/PBCH burst set.

In a possible design, the reference location of the detection window is determined based on a location of the first SS/PBCH block in the first SS/PBCH burst set in the RMSI detection period.

In a possible design, the SS/PBCH block is a candidate SS/PBCH block in the SS/PBCH burst set.

In a possible design, at least two adjacent RMSI detection windows in the RMSI detection period are continuous in time.

In a possible design, at least two RMSI detection windows in the RMSI detection period have same duration.

In a possible design, an offset of the RMSI detection window is measured in half a frame.

In a possible design, a starting time location of the RMSI detection window is related to the duration of the RMSI detection window.

In a possible design, a frequency location of RMSI control information is related to the duration and/or a time location of the RMSI detection window.

In a possible design, a subcarrier spacing of the RMSI is related to the starting time location and/or the time location of the RMSI detection window.

In a possible design, the frequency location of the RMSI control information is related to the starting time location and/or the time location of the RMSI detection window.

In a possible design, a starting location of the RMSI detection window is related to the first slot in half a system frame.

According to a second aspect, this application provides an RMSI communication method. The communication method includes determining, by a network device based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period, and sending, by the network device, the RMSI based on the location of the RMSI detection window.

In this communication method the network device can send the RMSI to the terminal device in the corresponding RMSI detection window, so that the terminal device can receive the RMSI.

In a possible design, the first RMSI detection window is an RMSI detection window corresponding to a synchronization signal (SS)/physical broadcast channel (PBCH) block whose time index is 0.

In a possible design, the reference location of the detection window in the RMSI detection period is determined based on the first system frame in the RMSI detection period and/or time information of the first system frame.

In a possible design, the time information of the first system frame is the first subframe of the first system frame or the first slot of the first system frame.

In a possible design, a reference location of a detection window set in the RMSI detection period is determined based on a location of an SS/PBCH block whose time index is 0 in an SS/PBCH burst set.

In a possible design, the reference location of the detection window is determined based on a location of the first SS/PBCH block in the first SS/PBCH burst set in the RMSI detection window period.

In a possible design, the SS/PBCH block is a candidate SS/PBCH block in the SS/PBCH burst set.

In a possible design, at least two adjacent RMSI detection windows in the RMSI detection window period are continuous in time.

In a possible design, at least two RMSI detection windows in the RMSI detection period have same duration.

In a possible design, an offset of the RMSI detection window is measured in half a frame.

In a possible design, a starting time location of the RMSI detection window is related to the duration of the RMSI detection window.

In a possible design, a frequency location of RMSI control information is related to the duration and/or a time location of the RMSI detection window.

In a possible design, a subcarrier spacing of the RMSI is related to the starting time location and/or the time location of the RMSI detection window.

In a possible design, the frequency location of the RMSI control information is related to the starting time location and/or the time location of the RMSI detection window.

In a possible design, a starting location of the RMSI detection window is related to the first slot in half a system frame.

According to a third aspect, an embodiment of this application provides a terminal device, and the terminal device has a function for implementing an action of the terminal device in the communication method according to the first aspect. The function may be implemented by hardware or may be implemented by hardware executing corresponding software. The hardware or software includes one or more modules, for example, a processor and a memory, corresponding to the foregoing function. The memory stores a related instruction, and the processor executes the instruction in the memory to complete each processing step in the foregoing communication method.

In a possible design, the terminal device includes a receiver and a processor, where the processor is configured to determine, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period, and the receiver is configured to receive the RMSI based on the location of the RMSI detection window.

The terminal device may further include a memory, and the memory is coupled to the processor, and stores a necessary program instruction and necessary data of the terminal device.

The terminal device may further include a transmitter, and the transmitter is configured to send information to a network device.

According to a fourth aspect, an embodiment of this application provides a network device, and the network device has a function for implementing an action of the network device in the communication method according to the second aspect. The function may be implemented by hardware or may be implemented by hardware executing corresponding software. The hardware or software includes one or more modules, for example, a processor and a memory, corresponding to the foregoing function. The memory stores a related instruction, and the processor executes the instruction in the memory to complete each processing step in the foregoing communication method.

In a possible design, the network device includes a transmitter and a processor, where the processor is configured to determine, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period, and the transmitter is configured to send the RMSI based on the location of the RMSI detection window.

The network device may further include a memory, and the memory is coupled to the processor, and stores a necessary program instruction and necessary data of the network device.

The network device may further include a receiver, where the receiver is configured to receive information sent by another device.

According to a fifth aspect, this application provides a computer readable storage medium. The computer readable storage medium stores program code executed by a terminal device. The program code includes an instruction used to perform the communication method according to the first aspect.

According to a sixth aspect, this application provides a computer readable storage medium. The computer readable storage medium stores program code executed by a network device. The program code includes an instruction used to perform the communication method according to the second aspect.

According to a seventh aspect, this application provides a computer program product that includes an instruction. When the computer program product is run on a terminal device, the terminal device is enabled to perform the communication method according to the first aspect.

According to an eighth aspect, this application provides a computer program product that includes an instruction. When the computer program product is run on a network device, the network device is enabled to perform the communication method according to the second aspect.

According to a ninth aspect, this application provides a system chip, and the system chip includes an input/output interface, at least one processor, at least one memory, and a bus. The at least one memory is configured to store an instruction, and the at least one processor is configured to call the instruction in the at least one memory to perform an operation in the communication method according to the first aspect or the second aspect.

BRIEF DESCRIPTION OF THE DRAWINGS

FIG. 1 is a schematic architectural diagram of a communications system that uses a communication method according to an embodiment of this application;

FIG. 2 is a schematic flowchart of a communication method according to an embodiment of this application;

FIG. 6 is a schematic diagram of sending of RMSI and an SS/PBCH block according to an embodiment of this application;

FIG. 7 is a schematic flowchart of a communication method according to another embodiment of this application;

FIG. 8 is a schematic structural diagram of a terminal device according to an embodiment of this application.

DETAILED DESCRIPTION OF ILLUSTRATIVE EMBODIMENTS

Figure 3:
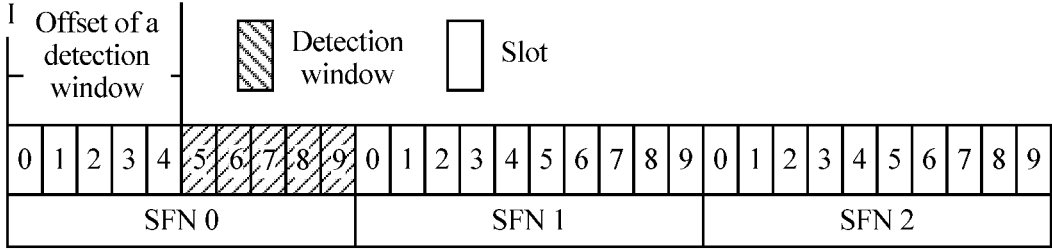
FIG. 3 is a schematic diagram of sending of RMSI and an SS/PBCH block according to an embodiment of this application.

The following describes technical solutions of this application with reference to the accompanying drawings.

FIG. 1 is a schematic diagram of a system to which an embodiment of this application is applied. As shown in FIG. 1, a system 100 may include a network device 102 and terminal devices 104, 106, 108, 110, 112, and 114. The network device is wirelessly connected to the terminal devices.

It should be understood that, in FIG. 1, that the system includes one network device is merely used as an example for description, but this embodiment of this application is not limited thereto. For example, the system may alternatively include more network devices. Similarly, the system may alternatively include more terminal devices. It should be further understood that the system may also be referred to as a network. This embodiment of this application sets no limitation thereto.

The terminal device may also be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a future evolved public land mobile network (PLMN), or the like.

As an example instead of a limitation, in the embodiments of this application, the terminal device may alternatively be a wearable device. The wearable device may also be referred to as a wearable intelligent device, and is a generic term of wearable devices, such as glasses, gloves, a watch, clothing, and shoes, obtained by performing intelligent design and development on daily wear by using a wearable technology. A wearable device is a portable device directly worn on a body or integrated into clothes or an accessory of a user. The wearable device is more than a hardware device, and implements powerful functions through software support, data exchange, and cloud interaction. In a broad sense, wearable intelligent devices include a large-sized device, for example, a smartwatch or smart glasses, that provide comprehensive functions and that can implement all or some functions independent of a smartphone, and include a device, for example, various types of smart bands and smart jewelry used for sign monitoring, that is intended for only a specific type of application functions and that needs to be used in cooperation with another device such as a smartphone.

The network device may be a device configured to communicate with the terminal device. The network device may be a base transceiver station (BTS) in a Global System for Mobile Communications (GSM) or Code Division Multiple Access (CDMA) system, may be a NodeB (NB) in a Wideband Code Division Multiple Access (WCDMA) system, may be an evolved NodeB (eNB, or eNodeB) in a Long Term Evolution (LTE) system, or may be a radio controller in a cloud radio access network (CRAN) scenario. Alternatively, the network device may be a relay station, an access node, an in-vehicle device, a wearable device, a network device in a future 5G network, a network device in a future evolved PLMN network, or the like.

In addition, in the embodiments of this application, the network device provides a service for a cell. The terminal device communicates with the network device by using a transmission resource (for example, a frequency domain, namely, a spectrum resource) used by the cell, and the cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These cells are characterized by small coverage and low transmit power and are suitable for providing a high-rate data transmission service. In addition, the cell may alternatively be a hypercell.

In the embodiments of this application, quasi co-location (QCL) means being the same or having a definite correspondence in terms of at least one of the following parameters: an angle of arrival (AoA), a dominant angle of arrival (Dominant AoA), an average angle of arrival, a power angular spectrum of the angle of arrival (PAS of AoA), an angle of departure (AoD), a dominant angle of departure, an average angle of departure, a power angular spectrum of the angle of departure, UE transmit beamforming, UE receive beamforming, spatial channel correlation, base station transmit beamforming, base station receive beamforming, an average channel gain, an average channel delay, delay spread, Doppler spread, and the like.

Having a same downlink signal/base station beam/terminal beam means having a same space receiving parameter and/or a same antenna port, for example, being the same or having a definite correspondence in terms of at least one of the following parameters: an angle of arrival, a dominant angle of arrival Dominant AoA, an average angle of arrival, a power angular spectrum of the angle of arrival, an angle of departure, a dominant angle of departure, an average angle of departure, a power angular spectrum of the angle of departure, terminal transmit beamforming, UE receive beamforming, spatial channel correlation, base station transmit beamforming, base station receive beamforming, an average channel gain, an average channel delay, delay spread, Doppler spread, and the like.

When an RMSI detection window and an SS/PBCH block are associated or are in a QCL relationship, RMSI and the SS/PBCH block may have a same antenna port and/or be sent by using a same beam.

The RMSI detection window in this application is also referred to as an RMSI monitoring window. The RMSI monitoring window may be a physical downlink control channel (PDCCH) monitoring window of RMSI, may be a physical downlink shared channel (PDSCH) monitoring window of RMSI, may be a control information set (CORE-SET) monitoring window of RMSI, may be a monitoring window of data information, or may be a monitoring window of RMSI control information.

FIG. 2 is a schematic flowchart of an RMSI communication method according to an embodiment of this application. In FIG. 2, a network device may be the network device described above, and a terminal device may be the terminal device described above. Certainly, in an actual system, a quantity of network devices and a quantity of network devices may be not limited to an example in this embodiment or another embodiment. Details are not described below.

S210. The terminal device determines, based on offset information, a time index of an RMSI detection window corresponding to the terminal device, and duration of the RMSI detection window corresponding to the terminal device, a location of the RMSI detection window corresponding to the terminal device, where the offset information is determined based on an offset (window offset) between a reference location of the RMSI detection window detection window in an RMSI detection period and a first RMSI detection window in the RMSI detection period and based on the reference location of the RMSI detection window detection window in the RMSI detection period.

S220. The terminal device receives RMSI based on the location of the RMSI detection window.

The first RMSI detection window is an RMSI detection window corresponding to a synchronization signal (SS)/physical broadcast channel (PBCH) block whose time index is 0.

A time index of an SS/PBCH block may be used as the time index of the RMSI detection window. The time index of the SS/PBCH block may be a time index of a candidate SS/PBCH block, or may be a time index of an actually sent SS/PBCH block. The time index of the candidate SS/PBCH block may also be referred to as a time index of a possibly transmitted SS/PBCH block. The time index of the candidate SS/PBCH block may be referred to as an index of the candidate SS/PBCH block for short.

Alternatively, the time index of the RMSI detection window may be predefined.

Alternatively, the location of the RMSI detection window may be determined based on the time index that is of the RMSI detection window and that is associated with the time index of the SS/PBCH block.

The duration of the RMSI detection window may be predefined, or may be configured by the network device for the terminal device.

At least two adjacent detection windows may be continuous in time. At least two detection windows may have equal duration.

An offset of the RMSI detection window may be an offset between a starting time of the RMSI detection window and the reference location of the RMSI detection window detection window.

A granularity or a time unit of the offset of the detection window may be half a frame, a frame, a slot, a subframe, or a symbol. A method for representing the window offset may be based on a slot, an absolute time (in a unit of ms), a subframe, half a frame, or a symbol.

When the window offset is represented based on a slot, further, a unit length of the window offset may be related to a subcarrier spacing (SCS). For example, when the SCS is 15 KHz, the unit length of the window offset may be one slot, five slots, or 10 slots, when the SCS is 30 KHz, the unit length of the window offset may be one slot, five slots, 10 slots, or 20 slots, when the SCS is 60 KHz, the unit length of the window offset may be one slot, five slots, 10 slots, 20 slots, or 40 slots, or when the SCS is 120 KHz, the unit length of the window offset may be one slot, five slots, 10 slots, 20 slots, 40 slots, or 80 slots.

The window offset may be pre-configured on the terminal device without being indicated by the network device, or may be indicated by the network device. For example, the network device may indicate the window offset by using 1 bit, 2 bits, or 3 bits. The window offset may have a plurality of values. The values may be all or some of 0, 0.5 frame, 1 frame, 1.5 frames, 2 frames, 2.5 frames, 3 frames, 3.5 frames, 4 frames, 4.5 frames, 5 frames, 5.5 frames, 6 frames, 6.5 frames, 7 frames, and 7.5 frames. The 3 bits may indicate 0, 10 ms, 20 ms, 30 ms, 40 ms, 50 ms, 60 ms, or 70 ms.

When the window offset is indicated by using 1 bit, if the SCS is 15 KHz, the 1 bit may indicate that the window offset is zero slots or five slots, or the 1 bit may indicate that the window offset is five slots or 10 slots, if the SCS is 30 KHz, the 1 bit may indicate that the window offset is zero slots or 10 slots, or the 1 bit may indicate that the window offset is 10 slots or 20 slots, if the SCS is 60 KHz, the 1 bit may indicate that the window offset is zero slots or 20 slots, or the 1 bit may indicate that the window offset is 20 slots or 40 slots, or if the SCS is 120 KHz, the 1 bit may indicate that the window offset is zero slots or 40 slots, or the 1 bit may indicate that the window offset is 40 slots or 80 slots. Alternatively, the time unit may be equivalently transformed into another representation method. For example, if the SCS is 15 KHz, that the 1 bit may indicate that the window offset is five slots or 10 slots may be equivalently transformed into that the 1 bit may indicate that the window offset is 5 ms or 10 ms. This is also applicable in the following embodiments, and details are not described.

When the window offset is indicated by using 2 bits, if the SCS is 15 KHz, the 2 bits may indicate that the window offset is zero slots, five slots, 10 slots, or 15 slots, or the 2 bits may indicate that the window offset is five slots, 10 slots, 15 slots, or 20 slots, if the SCS is 30 KHz, the 2 bits may indicate that the window offset is zero slots, 10 slots, 20 slots, or 30 slots, or the 2 bits may indicate that the window offset is 10 slots, 20 slots, 30 slots, or 40 slots, if the SCS is 60 KHz, the 2 bits may indicate that the window offset is zero slots, 20 slots, 40 slots, or 60 slots, or the 2 bits may indicate that the window offset is 20 slots, 40 slots, 60 slots, or 80 slots, or if the SCS is 120 KHz, the 2 bits may indicate that the window offset is zero slots, 40 slots, 80 slots, or 120 slots, or the 2 bits may indicate that the window offset is 40 slots, 80 slots, 120 slots, or 160 slots.

Alternatively, the time unit of the window offset may be another time value, for example, any value of 0 slots to 63 slots.

Alternatively, a value of the window offset may be configured by using an absolute time unit. For example, when indication information is 2 bits, the window offset may be 0 milliseconds (ms), 5 ms, 10 ms, or 15 ms, or the window offset may be 5 ms, 10 ms, 15 ms, or 20 ms, and the time unit is 5 ms. When indication information is 1 bit, the window offset may be 0 ms or 5 ms, or the window offset may be 5 ms or 10 ms, and the time unit is 5 ms.

Alternatively, the time unit of the window offset may be half-frame. For example, the window offset may be zero half-frame, one half-frame, two half-frames.

Different detection windows may have different window offsets. For example, when the index of the SS/PBCH block is greater than a maximum quantity N of detection windows, and the RMSI is transmitted in a next frame or K adjacent frames, different detection windows may have different window offsets.

For example, at least two adjacent window offsets may be the same, or at least two adjacent window offsets may be different.

When the RMSI and the SS/PBCH block are multiplexed in a frequency division manner, because an SCS of the RMSI is the same as an SCS of the SS/PBCH block, i-bit data for indicating the SCS of the RMSI may be used to indicate some or all values of the window offset, or the 1-bit data for indicating the SCS of the RMSI may be used as some of bit data that indicates the window offset.

When the RMSI and the SS/PBCH block are multiplexed in a frequency division manner, duration of each detection window may be a fixed value, for example, 0.5 ms. Therefore, the duration of the detection window may be not configured. In this case, a bit used to indicate the duration of the detection window may be used to indicate the window offset.

The location of the RMSI detection window may be the starting time of the RMSI detection window. The starting time of the detection window may also be referred to as a starting location of the detection window.

The RMSI detection period may be configured for a PBCH by using four methods. In a first method, the RMSI detection period is directly configured. For example, 1 bit may be used to indicate that the RMSI detection period is 20 ms or 40 ms, or 1 bit may be used to indicate that the RMSI detection period is 40 ms or 80 ms, or 1 bit may be used to indicate that the RMSI detection period is 20 ms or 80 ms.

In a second method, the RMSI detection period is configured to a multiple of a period of the PBCH, and 1-bit information may be used to indicate that the multiple is one fold or two folds.

In a third method, a fixed RMSI detection period is configured, or a multiple of the RMSI detection period to a period of the PBCH is indicated. For example, 1 bit is used to indicate whether the RMSI detection period is fixed at 20 ms or is the same as a period of an SS/PBCH burst set, or 1 bit is used to indicate whether the RMSI detection period is fixed at 40 ms or is the same as a period of an SS/PBCH burst set.

When the RMSI detection period is unrelated to the period of the SS/PBCH burst set, in a fourth method, whether the RMSI detection period is the same as the period of the SS/PBCH burst set or is greater than the period of the SS/PBCH burst set is indicated. When the RMSI detection period is the same as the period of the SS/PBCH burst set, the location of the RMSI detection window can be determined even if the RMSI detection period is not indicated. However, when the RMSI detection period is greater than the period of the SS/PBCH burst set, a frame location of an SS/PBCH burst set associated with the RMSI needs to be blindly detected.

Alternatively, the RMSI detection period may be indicated, and whether the RMSI detection period is the same as the period of the SS/PBCH burst set or the period of the SS/PBCH burst set is less than the RMSI detection period is also indicated. In this case, blind detection does not need to be performed.

To facilitate transmission of the RMSI, a maximum quantity of RMSI detection windows in one subframe may be set to N. When the index of the SS/PBCH block (includ-ing the time index of the candidate SS/PBCH block and/or the index of the actually transmitted SS/PBCH block) is greater than N, the RMSI may be transmitted in a next frame or K adjacent frames. When the index of the SS/PBCH block (including the time index of the candidate SS/PBCH block and/or the index of the actually transmitted SS/PBCH block) is less than or equal to N, the RMSI may be transmitted in a current frame or a frame in which the starting location of the detection window is located.

For example, when the SS/PBCH block and a paging message or the RMSI are transmitted in a time division multiplexing manner, the RMSI or the paging message may be transmitted in half a frame different from that of the SS/PBCH block, or may be transmitted after a last actually transmitted or possibly transmitted SS/PBCH block.

The reference location of the detection window may be fixed or absolute. For example, the reference location of the detection window may be determined based on the first system frame in the RMSI detection period and/or time information of the first system frame in the RMSI detection period. For example, the time information of the first system frame may be the first subframe of the first system frame or the first slot of the first system frame.

Alternatively, the reference location of the detection window may be related to a location of the SS/PBCH block. For example, the reference location of the detection window may be determined based on a location (a frame and/or a slot and/or a symbol) of the first SS/PBCH block in the first SS/PBCH burst set in the RMSI detection period. For another example, the reference location of the detection window may be a location of the first SS/PBCH block in the first SS/PBCH burst set in the RMSI detection period.

When determining the location of the detection window, the terminal device may further determine the location of the detection window based on the SCS of the RMSI and the SCS of the SS/PBCH block.

When the SCS of the RMSI is the same as the SCS of the SS/PBCH block, the location of the detection window may be directly determined. When the SCS of the RMSI is different from the SCS of the SS/PBCH block, the reference location of the detection window and/or the offset of the detection window may be converted into values that are based on a same SCS, and then the location of the detection window is determined.

As described above, the reference location of the RMSI detection window may be fixed. The following describes how to determine the location of the RMSI detection window when the reference location of the RMSI detection window may be fixed.

That the reference location of the RMSI detection window is fixed in the RMSI detection period may include A frame location of the reference location of the RMSI detection window is fixed, and an intra-frame location of the reference location of the RMSI detection window is fixed. A frame in which the reference location is located may be referred to as a reference frame.

In this case, the terminal device may determine the location of the RMSI detection window based on the offset information, the time index of the detection window, and the duration of the RMSI detection window.

The reference location of the detection window herein may be a reference location of the first RMSI detection window in the RMSI detection period, or may be a reference location of an Nth RMSI detection window. N is a quantity of detection windows in the RMSI detection period.

The reference location of the detection window may be divided into two pails. A first part is a frame location of the reference location of the detection window, in other words, the first part is a frame number of a system frame in which the reference location of the detection window is located. A second part is an intra-frame location of the reference location of the detection window.

The first part may be calculated by using a formula. A calculation method is as follows: SFN mod y=k1. SFN represents the frame number of the system frame in which the reference location of the detection window is located, mod represents a modulo operation, y represents the RMSI detection period that is measured in a frame, and k1 is a predefined value.

For example, k1 may be a fixed value, for example, may be any value of 0, 1, 2, 3, 4, 5, 6, 7, 8, 9, 10, 11, 12, 13, 14, or 15. For example, k1 is 0.

For example, k1 may be configured based on information sent by the network device. For example, the network device may configure k1 by using a physical broadcast channel (PBCH).

For example, k1 may be configured in an implicit manner. For example, a value of k1 may be implicitly indicated by using a modulation and coding scheme of the PBCH, cyclic redundancy check (CRC) of the PBCH, a scrambling manner, or cyclic shift. For example, the value of k1 may be implicitly indicated by using frequency of a primary synchronization signal (PSS), frequency of a secondary synchronization signal (SSS), a time-domain location of the PSS, a time-domain location of the SSS, a cyclic shift of the PSS, a cyclic shift of the PSS, a DMRS, different sequences of the SSS, or different sequences of the PSS.

The second part of the reference location of the detection window may be based on a slot, or may be based on a subframe or based on a symbol. When the second part is based on a slot, an index of the slot may be any value of 0 to 63. When the second part is based on a subframe, an index of the subframe may be any value of 0 to 9. An example in which the second part is based on a symbol is that the second part is the first symbol. An example in which the second part is based on a slot is that the second part is the first slot, for example, a slot whose index is 0, in a frame.

When the second part is based on a slot, a value of the second part may be related to the subcarrier spacing (SCS) of the PBCH. For example, when the subcarrier spacing is 15 kilohertz (KHz), the value of the second part may be the fifth slot, when the subcarrier spacing is 30 KHz, the value of the second part may be the 10th slot, when the subcarrier spacing is 60 KHz, the value of the second part may be the 20th slot, and when the subcarrier spacing is 120 KHz, the value of the second part may be the 40th slot.

Optionally, there may be an offset or may not be an offset between the starting location of the detection window and the reference location of the detection window.

If there is no offset, the reference location of the detection window may also be referred to as the starting location of the detection window. If there is an offset, the offset may be referred to as the offset of the detection window.

When there is an offset between the starting location of the detection window and the reference location of the detection window, a starting location of the first detection window may be obtained based on the reference location of the detection window and the offset of the detection window.

For example, as shown in FIG. 3, the RMSI detection period includes four system frames, and frame numbers are respectively an SFN 0, an SFN 1, an SFN 2, and an SFN 3. The reference location of the detection window is fixed at the first slot of the first system frame in the RMSI detection period, namely, a slot whose slot index is 0 in the system frame whose frame number is the SFN 0. In addition, when the offset of the detection window is five slots, the starting location of the detection window may be a slot whose slot index is 5 in the system frame whose frame number is the SFN 0.

When adjacent detection windows are continuous in time and any two detection windows have same duration, the terminal device may calculate a starting location of any detection window in the RMSI detection period based on the reference location of the detection window, the offset of the detection window, and the index of the SS/PBCH block.

For example, the terminal device may calculate a starting location of an xth detection window based on a formula I+Window offset+x×SSB_TI, where I represents the reference location of the detection window, the window offset represents a time offset of the first detection window in the RMSI detection period relative to the reference location of the detection window, and SSB_TI represents the time index of the SS/PBCH block. SSB_TI may also be referred to as a time index of the RMSI.

Optionally, SSB_TI may represent the time index of the possibly transmitted SS/PBCH block, or may represent the time index of the actually transmitted SS/PBCH block.

For example, as shown in FIG. 3, when the reference location of the detection window is the first slot of the first frame, the window offset is five slots, and the duration of the detection window is one slot, a starting location of the second detection window is 0+5+1×2=7. In other words, the starting location of the second detection window is a slot whose index is 7 in the first frame.

When the RMSI is transmitted across frames, a frame in which the detection window is located may be calculated by using a formula k1+floor((I+Window offset+x×SSB_TI)/N), and a starting slot of the detection window may be calculated by using a formula (I+Window offset+x×SSB_TI) mod N. It can be learned that the starting location of the detection window may be related to a quantity of slots in a system frame or may be related to an SCS of the system frame. It should be noted that the starting location of the detection window herein is a starting location of one detection window.

When RMSI monitoring windows overlap, assuming that an overlapping coefficient is k, in other words, k monitoring windows overlap, a formula for calculating the starting location of the detection window is I+Window offset+x× floor(SSB_TI/k). Alternatively, the frame in which the detection window is located may be calculated by using a formula k1+floor((I+Window offset+x×floor(SSB_TI/k))/ N), and the starting location of the detection window is calculated by using a formula (I+Window offset+x×floor (SSB_TI/k)) mod N.

The index of the possibly transmitted SS/PBCH block received by the terminal device may be relatively large. For example, for an SS/PBCH block whose SCS is 60 KHz, an index of the SS/PBCH block received by the terminal device may be 45. If duration of one detection window is one slot, 45 slots are required. Therefore, the RMSI needs to be received in at least two frames.

A value of N may be determined based on information such as the RMSI detection period, a quantity of SS/PBCH blocks that are possibly transmitted in the period of the SS/PBCH burst set, a frequency band range of the SS/PBCH block, a service type of the terminal device, an uplink/ downlink time resource ratio, the subcarrier spacing, or the duration of the detection window.

For example, when the SCS is 15 KHz, the value of N may be 5, when the SCS is 30 KHz, the value of N may be 10, when the SCS is 60 KHz, the value of N may be 20, or when the SCS is 120 KHz, the value of N may be 40.

At least two adjacent detection windows may be discontinuous in time. In this case, during calculation of the location of the detection window, another offset needs to be introduced. The offset may be based on a frame. Some information or all information of an offset between two discontinuous monitoring windows may be definite, in other words, may be learned by the terminal device.

For example, a location of the first detection window is in an sth frame in the RMSI detection period, and a location of an (i+1)th detection window is in an (s+1)th frame in the RMSI detection period. In this case, a method for calculating a starting location slot of the detection window may be (I+Window offset+x×SSB_TI) mod i, where i is a positive integer and s is a positive integer.

When adjacent detection windows are discontinuous in time and there is a difference of z slots between starting locations of the adjacent detection windows, a frame in which a detection window is located may be calculated by using a formula s+floor((I+Window offset+z×SSB_TI)/N), and a slot in which the detection window is located may be calculated by using a formula (I+Window offset+z×SSB_TI) mod N.

When the RMSI control information and/or data information and the SS/PBCH block are multiplexed in a frequency division manner, an RMSI frequency location may be related to the duration of the RMSI detection window, or may be related to a starting time location of the RMSI detection window.

Figure 4:
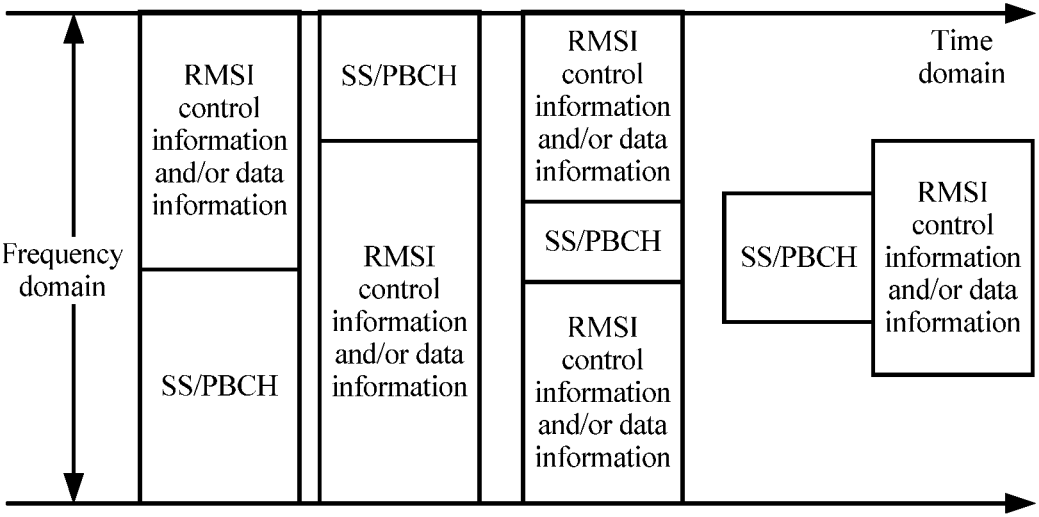
FIG. 4 is a schematic diagram of sending of RMSI and an SS/PBCH block according to an embodiment of this application.

For example, as shown in FIG. 4, there may be four cases concerning a frequency location of the RMSI control information and/or data information and a frequency location of the SS/PBCH block. First three cases show frequency location relationships existing when the RMSI control information and/or data information and the SS/PBCH block are multiplexed in a frequency division manner, and a last case shows a frequency location relationship existing when the RMSI control information and/or data information and the SS/PBCH block are multiplexed in a time division manner.

It can be seen from FIG. 4 that a frequency location of RMSI indicates that the RMSI and an SS/PBCH block are multiplexed in a frequency division manner. The location relationship between the frequency location of the RMSI control information and/or data information and the frequency location of the SS/PBCH block may indicate that the duration of the RMSI detection window is half a slot during frequency division multiplexing, or may indicate that the starting time location of the RMSI detection window is the same as a starting time location of the SS/PBCH block during frequency division multiplexing. In this case, the window offset may not need to be indicated.

The location of the detection window is relative. For example, when the location of the detection window is relative to the location of the SS/PBCH block, the location of the detection window may be determined by using different methods based on a relationship between the RMSI detection period and the period of the SS/PBCH burst set.

When the location of the detection window is relative, the location of the detection window may also be determined by detecting the relationship between the RMSI detection period and the period of the SS/PBCH burst set.

When the RMSI detection period is related to a period of the SS/PBCH block, the location of the detection window may be determined with reference to the method for determining the location of the detection window when the reference location of the detection window is fixed. It should be noted that the fixed reference location in the method for determining the location of the detection window when the reference location of the detection window is fixed needs to be replaced with the location of the SS/PBCH block, or the fixed reference location in the method for determining the location of the detection window when the reference location of the detection window is fixed needs to be replaced with a location of an ith SS/PBCH block, to determine a location of an ith detection window.

When the SCS of the RMSI is different from the SCS of the SS/PBCH block, the reference location of the detection window and/or the offset of the detection window may be converted into values that are based on a same SCS, and then the location of the detection window is determined based on the method for determining the location of the detection window when the SCS of the RMSI is the same as the SCS of the SS/PBCH.

When the SCS of the RMSI is the same as the SCS of the SS/PBCH block, the location of the detection window may be determined with reference to the method for determining the location of the detection window when the reference location of the detection window is fixed. It should be noted that the fixed reference location in the method for determining the location of the detection window when the reference location of the detection window is fixed needs to be replaced with the location of the SS/PBCH block, or the fixed reference location in the method for determining the location of the detection window when the reference location of the detection window is fixed needs to be replaced with the location of the ith SS/PBCH block, to determine the location of the ith detection window.

When the RMSI detection period is unrelated to the period of the SS/PBCH burst set, a slot in which an SS/PBCH block 0 in an SS/PBCH burst set 0 in the RMSI detection period is located may be used as the reference location of the detection window, a slot in which an SS/PBCH block 0 in an SS/PBCH burst set n in the RMSI detection period is located may be used as the reference location, a slot in which an SS/PBCH block n in an SS/PBCH burst set 0 in the RMSI detection period is located may be used as the reference location, a slot in which an SS/PBCH block n in an SS/PBCH burst set n in the RMSI detection period is located may be used as the reference location, a mini-slot in which an SS/PBCH block 0 in an SS/PBCH burst set 0 in the RMSI detection period is located may be used as the reference location, a mini-slot in which an SS/PBCH block n in an SS/PBCH burst set 0 in the RMSI detection period is located may be used as the reference location, a mini-slot in which an SS/PBCH block 0 in an SS/PBCH burst set n in the RMSI detection period is located may be used as the reference location, a mini-slot in which an SS/PBCH block n in an SS/PBCH burst set n in the RMSI detection period is located may be used as the reference location, the first symbol in which an SS/PBCH block 0 in an SS/PBCH burst set 0 in the RMSI detection period is located may be used as the reference location, the first symbol in which an SS/PBCH block n in an SS/PBCH burst set 0 in the RMSI detection period is located may be used as the reference location, the first symbol in which an SS/PBCH block 0 in an SS/PBCH burst set n in the RMSI detection period is located may be used as the reference location, or a first symbol in which an SS/PBCH block n in an SS/PBCH burst set n in the RMSI detection period is located may be used as the reference location. For example, the first SS/PBCH block in the first SS/PBCH burst set in the RMSI detection period is used as the reference location.

When the RMSI detection period is unrelated to the period of the SS/PBCH block, the RMSI detection period is unknown, or the period of the SS/PBCH block is unknown, or in other cases, after the terminal device detects the SS/PBCH block, the terminal device cannot determine the location of the detection window based on the location of the SS/PBCH block. In this case, the terminal device may receive the RMSI by using five methods.

In a first method, the terminal device blindly detects the detection window, to determine the location of the detection window.

For example, after detecting the SS/PBCH block, the terminal device blindly detects a plurality of time windows in which the RMSI may be transmitted. Duration of each time window may be 5 ms or 10 ms.

In a second method, the network device indicates, by using a PBCH, a location of a detection window associated with the SS/PBCH block, or indicates a location that is of the SS/PBCH burst set and that is used as the reference location of the detection window. The network device calculates the location of the RMSI detection window based on the indication of the network device.

The network device indicates that the location of the RMSI monitoring window associated with the SS/PBCH block is a frame in which the SS/PBCH burst set associated with the RMSI is located, may be a location of a frame in which the SS/PBCH burst set is located in one RMSI detection period, or may be a location of a frame in which a transmission time interval (transmission time interval, TTI) between the RMSI and the SS/PBCH burst set is located, where 3 bits may be used to indicate 8 frame locations, 2 bits may be used to indicate four frame locations, or 1 bit may be used to indicate two frame locations.

In a third method, the network device indicates the period of the SS/PBCH burst set by using a PBCH. After detecting an SS/PBCH block in an SS/PBCH burst set, the terminal device may determine, based on information such as frame information, slot information, and symbol information of the received SS/PBCH block, a location that is of the SS/PBCH burst set and that is used as the reference location of the detection window, to determine the starting location of the detection window.

In a fourth method, the network device indicates, by using a PBCH, whether an SS/PBCH burst set in which the PBCH is located is associated with a detection window set in the RMSI detection period, to determine an RMSI location, or whether the SS/PBCH burst set in which the PBCH is located is a reference SS/PBCH burst set of the RMSI detection window. For example, 1 bit may be used for indication. After detecting an SS/PBCH block in an SS/PBCH burst set, the terminal device determines, based on the information, whether the SS/PBCH burst set in which the PBCH is located is associated with a detection window set in the RMSI detection period, to determine the RMSI location, or whether the SS/PBCH burst set in which the PBCH is located is the reference SS/PBCH burst set of the RMSI detection window, and then determines whether to detect an SS/PBCH burst set or an SS/PBCH block for a next time.

A fifth method is a combination of the foregoing methods.

When the RMSI detection period is related to the period of the SS/PBCH burst set, a relationship between the RMSI detection period and the period of the SS/PBCH burst set may be any one of the following: The RMSI detection period is the same as the period of the SS/PBCH block, the RMSI detection period is an integral multiple of the period of the SS/PBCH block, and the RMSI detection period is greater than the period of the SS/PBCH block, and the RMSI detection period is a fractional multiple or a decimal multiple of the period of the SS/PBCH block.

When the RMSI detection period is different from the period of the SS/PBCH block, the RMSI detection period may be fixed or may be unfixed. For example, the fixed RMSI detection period may be 20 ms or 40 ms.

When the RMSI detection period is unfixed, the RMSI detection period may be a multiple of the period of the SS/PBCH burst set. Specifically, the multiple may be an integral multiple, for example, two folds, or may be a fractional multiple, for example, ½ fold.

When the RMSI detection period is the same as the period of the SS/PBCH block, the reference location of the detection window may be determined based on the location of the first SS/PBCH block in the SS/PBCH burst set, or the location of the ith detection window may be determined based on the location of the first SS/PBCH block in the SS/PBCH burst set.

The following describes a method used by the terminal device to determine the reference location of the detection window and further determine the location of the detection window based on the reference location when the RMSI detection period is the same as the period of the SS/PBCH block.

Two cases obtained after a case in which the RMSI detection period is the same as the period of the SS/PBCH block is further divided are described below. In one case, the reference location of the detection window is related to the location of the SS/PBCH block. In the other case, a reference location of the ith detection window in the RMSI detection period is related to the location of the ith SS/PBCH block in the SS/PBCH burst set.

Figure 5:
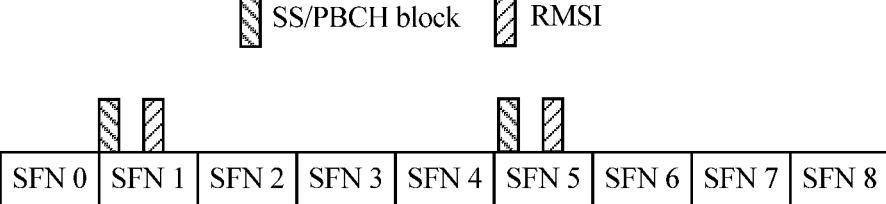
FIG. 5 is a schematic diagram of sending of RMSI and an SS/PBCH block according to an embodiment of this application.

An example in which the RMSI detection period is the same as the period of the SS/PBCH block is shown in FIG. 5. The RMSI detection period and the period of the SS/PBCH block each are 40 ms.

The following describes a method used by the terminal device to determine the reference location of the detection window and further determine the location of the detection window based on the reference location when the reference location of the detection window is related to the location of the SS/PBCH block.

When the RMSI detection period is the same as the period of the SS/PBCH block, the reference location of the detection window may be the location of the first SS/PBCH block in the SS/PBCH burst set. In this way, after detecting the SS/PBCH block, the terminal device may deduce the period of the SS/PBCH block based on the RMSI detection period, deduce, based on an index of the received SS/PBCH block, a location of the first possibly transmitted SS/PBCH block in the SS/PBCH burst set, and use the location as the reference location of the detection window.

Then, a location of an (SSB_TI)th detection window may be deduced by using a formula O+Window offset+xx SSB_TI. SSB_TI is the time index that is of the SS/PBCH block and that starts from o. O is the location of the first SS/PBCH block in the SS/PBCH burst set, and may be a slot o or a slot n, may be a subframe o or a subframe n, or may be a mini-slot o or a mini-slot n.

When O is the slot o, O may not exist in the formula. In other words, the formula may be simplified into Window offset+xx SSB_TI.

A feature of the window offset may include a feature of the window offset when the reference location of the detection window is fixed. Details are not described herein again.

In addition, a data bit for indicating FDM or TDM may be used to indicate the window offset. For example, a data bit value for indicating FDM may indicate that the starting location of the detection window is the same as a location that is of an SS/PBCH block in an SS/PBCH burst set and that is used as the reference location of the detection window, where i is any value of O to N, and N is a quantity of detection windows in the RMSI detection period.

For example, a data bit for indicating TDM may indicate that the reference location of the detection window differs, by half a frame, from a location that is of an SS/PBCH block in an SS/PBCH burst set and that is used as the reference location of the detection window.

When an SCS of the SS/PBCH block is different from the SCS of the RMSI, a window offset that is defined based on the SCS of the SS/PBCH block may be used, or a window offset that is defined based on the SCS of the RMSI may be used.

A unit of a slot at the location that is of the SS/PBCH block and that is used as the reference location of the detection window may be defined based on the SCS of the SS/PBCH block or may be defined based on the SCS of the RMSI.

In addition, the window offset is not based on half a frame. A size of the window offset is n slots. A unit of a slot may be based on the SCS of the SS/PBCH block or may be based on the SCS of the RMSI.

A first method for calculating the starting location of the RMSI detection window may include a value of O is based on the SCS of the SS/PBCH block, the window offset is based on the SCS of the RMSI, and the value of O is transformed into the SCS of the RMSI. When the SCS of the RMSI is greater than the SCS of the SS/PBCH block, a value obtained after transforming O is $O\_RMSI=O\times m$, where m represents a multiple relationship between the SCS of the RMSI and the SCS of the SS/PBCH block. When the SCS of the RMSI is less than the SCS of the SS/PBCH block, a value obtained after transforming O is $O\_RMSI=floor(O/m)$, where m represents a multiple relationship between the SCS of the SS/PBCH block and the SCS of the RMSI.

The foregoing formulas for calculating O_RMSI may be combined into $O\_RMSI=floor(O\times m)$, where m may represent that the SCS of the SS/PBCH block is a fractional multiple or an integral multiple of the SCS of the RMSI.

After O_RMSI is calculated, the specific location of the RMSI detection window may be calculated by using a formula $O\_RMSI+Window\ offset+x\times SSB\_TI$, where x is the duration of the detection window, and SSB_TI is the time index of the detection window or the index of the SS/PBCH block.

A second method for calculating the starting location of the RMSI detection window may include a value of O is based on the SCS of the SS/PBCH block, the window offset is based on the SCS of the SS/PBCH block, and a value of O+Window offset is transformed into the SCS of the RMSI. When the SCS of the RMSI is greater than the SCS of the SS/PBCH block, a value obtained after transforming O+Window offset is $(O+Window\ offset)\times m$, where m represents a multiple relationship between the SCS of the RMSI and the SCS of the SS/PBCH block. When the SCS of the RMSI is less than the SCS of the SS/PBCH block, a value obtained after transforming O+Window offset is $floor((O+Window\ offset)/m)$, where m represents a multiple relationship between the SCS of the SS/PBCH block and the SCS of the RMSI.

The two formulas for transforming O+Window offset may be combined into $floor((O+Window\ offset)\times m)$. m represents the multiple relationship between the SCS of the SS/PBCH block and the SCS of the RMSI, where m may represent a fractional multiple or may represent an integral multiple.

After (O+Window offset)×m) is calculated, the specific location of the RMSI detection window is then calculated by using a formula $floor((O+Window\ offset)\times m)+x\times SSB\_TI$.

Alternatively, the starting location or the specific location of the RMSI detection window may be determined based on a maximum quantity N of detection windows transmitted in one frame.

For example, if a frame number of a frame in which the SS/PBCH burst set is located is k1, when the index of the RMSI detection window or the time index of the SS/PBCH block associated with the RMSI is greater than N, the RMSI may be transmitted in a frame whose frame number is k1+1.

If $floor((floor((O+Window\ offset)\times m)+x\times SSB\_TI)/N)$ =k2, the RMSI detection window is transmitted in a frame whose frame number is k1+k2.

If $(floor((O+Window\ offset)\times m)+x\times SSB\_TI)\ mod\ N=k3$, a slot location of the RMSI detection window in a frame whose frame number is k1+k2 is $floor((O+Window\ offset)\times m)+k3\times SSB\_TI$.

Indication information of the window offset may be multiplexed with other information. For example, when the RMSI and the SS/PBCH block are multiplexed in a frequency division manner, because the SCS of the RMSI is the same as the SCS of the SS/PBCH block, i-bit data for indicating the SCS may be used to indicate some values or all values of the window offset, or the 1 bit is used as a part of the indication information of the window offset. For example, when a data bit of the information that indicates the window offset is 1 bit, and 0 ms or 5 ms is indicated, the 1 bit is further used for indication. When the 1-bit data for indicating the SCS is used to indicate some values or all values of the window offset, the bit indicates 15 ms and 10 ms. When the 1-bit data for indicating the SCS is used as a part of the indication information of the window offset, there are two bits, where 00 represents 0 ms, 01 represents 5 ms, 10 represents 10 ms, and 11 represents 15 ms.

When the RMSI and the SS/PBCH block are multiplexed in a frequency division manner, duration of each RMSI monitoring window may be 0.5 ms. Therefore, the duration of the detection window may be not configured. In this way, a data bit for indicating the duration of the detection window may be used to indicate the window offset. For example, when a data bit of information that indicates the window offset is 1 bit, information that indicates the duration of the detection window is 1 bit, and 0 ms or 5 ms is indicated, the 1 bit is further used for indication. When the 1-bit data for indicating the SCS is used to indicate some values or all values of the window offset the bit indicates 15 ms and 10 ms. When the 1-bit data for indicating the SCS is used as a part of the indication information of the window offset, there are two bits, where 00 represents 0 ms, 01 represents 5 ms, 10 represents 10 ms, and 11 represents 15 ms.

Different detection windows may have different window offsets. At least two adjacent window offsets may be the same, or at least two adjacent window offsets may be different. For example, when one frame has 10 slots, the first five slots may be used for downlink transmission, and the last five slots are used for uplink transmission. The starting location of the RMSI monitoring window starts from a slot 3. There are four RMSI detection windows, and duration of each detection window is one slot. In this case, an offset of the last RMSI monitoring window is five slots, to avoid an uplink data transmission slot. The offset of the last monitoring window is different from offsets of previous three monitoring windows.

When the RMSI control information and/or data information and the SS/PBCH block are multiplexed in a frequency division manner, an RMSI frequency location may be related to the duration of the RMSI detection window, or may be related to the starting location of the RMSI detection window.

A relationship between a frequency location of the RMSI control information and/or data information and a frequency location of the SS/PBCH block is shown in FIG. 3. Details are not described herein again.

The frequency location of the RMSI control information, the duration of the RMSI detection window, and the location of the RMSI detection window or the window offset may be jointly configured. The foregoing configured parameters of the RMSI may be related to the RMSI detection period and/or the period of the SS/PBCH burst set. The foregoing parameters of the RMSI may be configured by using an index indication method. For example, as shown in Table 1, a case in Table 1 may be alternatively indicated by using 4 bits. Duration information of the RMSI detection window or location information of the RMSI in time division is added and is shown in Table 2. Table 2 is an example, and some or all values in Table 2 may be used in an actual situation.

TABLE 1

Method for configuring the parameters of the RMSI

| Frequency-domain location of an RMSI control resource set | Duration (quantity of slots) of the RMSI detection window | Location of the RMSI | Configured bit or index |
| --- | --- | --- | --- |
| Frequency division 1 | 1 | On the SS/PBCH block | 000 |
| Frequency division 2 | 1 | On the SS/PBCH block | 001 |
| Frequency division 3 | 1 | On the SS/PBCH block | 10 |
| Time division | 1 | Half a frame | 11 |
| Time division | 2 | Half a frame | 100 |
| Time division | 1 | One frame | 101 |
| Time division | 2 | One frame | 110 |

TABLE 2

Method for configuring the parameters of the RMSI: 4 bits

| Frequency-domain location of an RMSI control resource set | Duration (quantity of slots) of the RMSI detection window | Location of the RMSI | Configured bit or index |
| --- | --- | --- | --- |
| Frequency division 1 | 1 | On the SS/PBCH block | 0000 |
| Frequency division 2 | 1 | On the SS/PBCH block | 0001 |
| Frequency division 3 | 1 | On the SS/PBCH block | 0010 |
| Time division | 1 | Half a frame | 0011 |
| Time division | 2 | Half a frame | 0100 |
| Time division | 1 | One frame | 0101 |
| Time division | 2 | One frame | 0111 |
| Time division | 4 | Half a frame | 1000 |

TABLE 2-continued

Method for configuring the parameters of the RMSI: 4 bits

| Frequency-domain location of an RMSI control resource set | Duration (quantity of slots) of the RMSI detection window | Location of the RMSI | Configured bit or index |
| --- | --- | --- | --- |
| Time division | 4 | One frame | 1001 |
| Time division | 0.5 | Half a frame | 1010 |
| Time division | 0.5 | One frame | 1011 |
| Time division | 0.5 | 1.5 frames | 1100 |
| Time division | 1 | 1.5 frames | 1101 |
| Time division | 2 | 1.5 frames | 1110 |
| Time division | 4 | 1.5 frames | 1111 |

RMSI detection windows may overlap. In other words, one RMSI detection window may be associated with a plurality of SS/PBCH blocks. A quantity of associated SS/PBCH blocks may be configured or may be stipulated in a protocol.

When the RMSI monitoring windows overlap, a plurality of pieces of RMSI control information sent in one RMSI detection window may respectively correspond to different SS/PBCH blocks.

When plurality of pieces of RMSI control information are sent in one slot, it may be predefined that RMSI information in the RMSI detection windows may be sent in a time sequence or may be sent in a frequency sequence.

For example, it may be stipulated in the protocol that or the network device may indicate that the first piece of RMSI control information is sent on the first symbol in the slot, and the second piece of RMSI control information is sent on the second symbol in the slot, or it may be stipulated in the protocol that or the network device may indicate that the first piece of RMSI control information is sent on the second symbol in the slot, and the second piece of RMSI control information is sent on the third symbol in the slot, or it may be stipulated in the protocol that or the network device may indicate that the first piece of RMSI control information is sent on the first symbol in the slot, and the second piece of RMSI control information is sent on the third symbol in the slot, or it may be stipulated in the protocol that or the network device may indicate that the first piece of RMSI control information is sent on the first symbol in the slot, the second piece of RMSI control information is sent on the second symbol in the slot, and the third piece of RMSI control information is sent on the third symbol in the slot, or it may be stipulated in the protocol that or the network device may indicate that the first piece of RMSI control information is sent on the first or the second symbol in the slot, and the second piece of RMSI control information is sent on the third symbol in the slot, or it may be stipulated in the protocol that or the network device may indicate that the first piece of RMSI control information is sent on the first symbol in the slot, and the second piece of RMSI control information is sent on the second or the third symbol in the slot, or it may be stipulated in the protocol that or the network device may indicate that the first piece of RMSI control information is sent on the first symbol in the slot, and the second piece of RMSI control information is sent on the seventh symbol in the slot.

The following describes a case in which the RMSI detection period is the same as the period of the SS/PBCH block and the reference location of the ith RMSI detection window is related to the location of the ith SS/PBCH block in the SS/PBCH burst set.

When the RMSI detection period is the same as the period of the SS/PBCH block, the location of the ith SS/PBCH block in the SS/PBCH burst set may be used as the reference location O of the ith RMSI detection window.

In this way, after detecting the ith SS/PBCH block the terminal device may determine the location of the ith RMSI detection window based on an offset of the ith RMSI detection window relative to the ith SS/PBCH block. The RMSI detection window and the SS/PBCH block may be in a QCL relationship.

When the SS/PBCH block is based on half a slot and the RMSI detection window is based on a slot, a starting location of the ith RMSI detection window is related to an index of an SS/PBCH block associated with the detection window and duration of the detection window.

The offset of the ith RMSI detection window relative to the ith SS/PBCH block may be configured in a plurality of manners.

In one method, PBCH content in each SS/PBCH block is unique. In this way, a specific value of an offset of each SS/PBCH block relative to each RMSI detection window that is in a QCL relationship with the SS/PBCH block is placed in the PBCH content. In this case, the location of the RMSI detection window may be calculated by using the formula $O\_SSi+Time\ offseti$, where $O\_SSi$ represents the location of the ith SS/PBCH block, and Time offseti represents an offset of the location of the ith SS/PBCH block relative to the ith RMSI detection window.

The reference location $O\_SSi$ of the starting location of the RMSI detection window may be related to the SCS of the RMSI or the SCS of the SS/PBCH block.

When a value of $O\_SSi$ and a value of Time offseti are both based on the SCS of the RMSI, the starting location of the RMSI detection window may be directly calculated by using a formula $O\_SSi+Time\ offseti$.

When $O\_SSi$ is based on the SCS of the SS/PBCH block, and Time offseti is based on the SCS of the RMSI, the value of $O\_SSi$ may be first transformed into the SCS of the RMSI.

When the SCS of the RMSI is greater than the SCS of the SS/PBCH block, a value obtained after transforming $O\_SSi$ into the SCS of the RMSI is $O\_RMSIi=O\_SSi\times m$, where m represents a multiple of the SCS of the RMSI relative to the SCS of the SS/PBCH block.

When the SCS of the RMSI is less than the SCS of the SS/PBCH block, a value obtained after transforming $O\_SSi$ into the SCS of the RMSI is $O\_RMSIi=floor(O\_SSi/m)$, where m represents a multiple of the SCS of the SS/PBCH block relative to the SCS of the RMSI.

The foregoing formulas for transforming $O\_SSi$ may be combined into $O\_RMSIi=floor(O\_SSi\times m)$, where m represents the multiple of the SCS of the SS/PBCH block relative to the SCS of the RMSI. Specifically, m may represent a fractional multiple or may represent an integral multiple.

The location of the RMSI detection window may be related to the index of the RMSI detection window or the index of the SS/PBCH block that is in a QCL relationship with the RMSI detection window. In this case, $O\_RMSIi+Time\ offseti+x\times SSB\_TI$ may be calculated, to obtain the location of the RMSI detection window.

When $O\_SSi$ is based on the SCS of the RMSI, and Time offseti is based on the SCS of the SS/PBCH block, the value of Time offseti may be first transformed into the SCS of the RMSI.

When the SCS of the RMSI is greater than the SCS of the SS/PBCH block, a value obtained after transforming Time offseti into the SCS of the RMSI is $TO\_RMSIi=Time$ $offseti\times m$, where m represents a multiple of the SCS of the RMSI relative to the SCS of the SS/PBCH block.

When the SCS of the RMSI is less than the SCS of the SS/PBCH block, a value obtained after transforming Time offseti into the SCS of the RMSI is $TO\_RMSIi=floor(Time\ offseti/m)$, where m represents a multiple of the SCS of the SS/PBCH block relative to the SCS of the RMSI.

The foregoing two formulas for calculating $TO\_RMSIi$ may be combined into $TO\_RMSIi=floor(O\_SSi\times m)$, where m represents the multiple of the SCS of the SS/PBCH block relative to the SCS of the RMSI, and m may represent a fractional multiple or may represent an integral multiple.

When the location of the RMSI detection window is related to the index of the RMSI detection window or the index of the SS/PBCH block that is in a QCL relationship with the RMSI detection window, the location of the RMSI detection window may be obtained by calculating $O\_SSi+TO\_RMSIi+x\times SSB\_TI$. In this case, if $O\_SSi$ is based on the SCS of the SS/PBCH block, and Time offseti is based on the SCS of the SS/PBCH block, the SCS of the SS/PBCH block may be transformed into the SCS of the RMSI by using a same method.

When the location of the RMSI detection window is related to the index of the RMSI detection window or related to the index of the SS/PBCH block that is in a QCL relationship with the RMSI detection window, the index of the RMSI detection window may be the same as an index of a to-be-transmitted SS/PBCH block. In this case, if the duration of the RMSI detection window is one slot, the specific location of the RMSI detection window may be $(O\_SSi+Time\ offseti+SSB\_TI)\ mod\ 2$. If the duration of the RMSI detection window is greater than 1 slot, for example, the duration is two slots, the specific location of the RMSI detection window may be calculated by using a formula $O\_SSi+Time\ offset+x\times(SSB\_TI\ mod\ 2)+3\times floor(SSB\_TI/2)$.

The following describes a case in which the RMSI detection period is an integral multiple of the period of the SS/PBCH burst set and the location of the detection window is related to the location of the SS/PBCH block in the SS/PBCH burst set.

An example in which the RMSI detection period is an integral multiple of the period of the SS/PBCH burst set is shown in FIG. 6. The RMSI detection window period is 40 ms, and the period of the SS/PBCH block is 10 ms.

When the RMSI detection period is an integral multiple of the period of the SS/PBCH burst set, a slot in which an SS/PBCH block 0 in an SS/PBCH burst set 0 in the RMSI detection period is located may be used as the reference location of the RMSI detection window detection window, or a slot in which an SS/PBCH block 0 in an SS/PBCH burst set n in the RMSI detection period is located may be used as the reference location of the RMSI detection window detection window, or a slot in which an SS/PBCH block n in an SS/PBCH burst set 0 in the RMSI detection period is located may be used as the reference location of the RMSI detection window detection window, or a slot in which an SS/PBCH block n in an SS/PBCH burst set n in the RMSI detection period is located may be used as the reference location of the RMSI detection window detection window, or a mini-slot in which an SS/PBCH block 0 in an SS/PBCH burst set 0 in the RMSI detection period is located may be used as the reference location of the RMSI detection window detection window, or a mini-slot in which an SS/PBCH block n in an SS/PBCH burst set 0 in the RMSI detection period is located may be used as the reference location of the RMSI detection window detection window, or a mini-slot in which an SS/PBCH block 0 in an SS/PBCH burst set n in the RMSI detection period is located may be used as the reference location of the RMSI detection window detection window, or a mini-slot in which an SS/PBCH block n in an SS/PBCH burst set n in the RMSI detection period is located may be used as the reference location of the RMSI detection window detection window, or the first symbol in which an SS/PBCH block 0 in an SS/PBCH burst set 0 in the RMSI detection period is located may be used as the reference location of the RMSI detection window detection window, or the first symbol in which an SS/PBCH block n in an SS/PBCH burst set 0 in the RMSI detection period is located may be used as the reference location of the RMSI detection window detection window, or the first symbol in which an SS/PBCH block 0 in an SS/PBCH burst set n in the RMSI detection period is located may be used as the reference location of the RMSI detection window detection window, or the first symbol in which an SS/PBCH block n in an SS/PBCH burst set n in the RMSI detection period is located may be used as the reference location of the RMSI detection window detection window.

A frame number of a reference frame or a starting frame of the RMSI detection period may be calculated by using a formula SFN mod y=k2, where y represents the RMSI detection period that is measured in a frame, a value of k2 may be fixed, for example, may be any one of 0, 1, 2, 3, 4, 5, 6, 7, 8, 9, 10, 11, 12, 13, 14, or 15, for example, 0, and SFN represents the frame number of the reference frame of the RMSI detection period.

For a manner for calculating a frame number of a reference frame or a starting frame of the period of the SS/PBCH block, refer to the manner for calculating the frame number of the reference frame or the starting frame of the RMSI detection period. Details are not described herein again.

The RMSI detection period is an integral multiple of the period of the SS/PBCH block. Therefore, after detecting the SS/PBCH block, the terminal device may deduce the period of the SS/PBCH block based on the RMSI detection period, and determine, based on a frame number of the SS/PBCH block, a frame number of an SS/PBCH burst set that is used as a reference of the RMSI. For example, a frame number of the first SS/PBCH burst set in the RMSI detection period may be used as a frame number used for determining the location of the RMSI detection window.

Next, a location of a possibly transmitted SS/PBCH block 0 in the SS/PBCH burst set may be determined based on an index of the received SS/PBCH block, the location may be used as the reference location of the RMSI detection window detection window, and the location of the first RMSI detection window is calculated by using a formula O+Window offset+x×SSB_TI. O is the location of the first SS/PBCH block in the SS/PBCH burst set. The location of the first SS/PBCH block may be a slot o or a slot n, may be a subframe n or a subframe n, may be a mini-slot o or a mini-slot n, or may be a symbol 0 or a symbol n. Optionally, the location of the RMSI detection window may alternatively be calculated based on Window offset+x×SSB_TI.

A feature of the window offset may be the same as a feature of the window offset obtained when the reference location of the RMSI detection window detection window is fixed.

A unit of O may be based on the SCS of the SS/PBCH block, or may be based on the SCS of the RMSI. The window offset may be based on the SCS of the SS/PBCH block, or may be based on the SCS of the RMSI.

When O is based on the SCS of the SS/PBCH block, and the window offset is based on the SCS of the RMSI, a value of O may be first transformed into the SCS of the RMSI.

When the SCS of the RMSI is greater than the SCS of the SS/PBCH block, a value obtained after transforming O into the SCS of the RMSI is O_RMSI=O×m, where m represents a multiple of the SCS of the RMSI relative to the SCS of the SS/PBCH block.

When the SCS of the RMSI is less than the SCS of the SS/PBCH block, a value obtained after transforming O into the SCS of the RMSI is O_RMSI=floor(O/m), where m represents a multiple of the SCS of the SS/PBCH block relative to the SCS of the RMSI.

The two formulas for transforming O may be combined into O_RMSI=floor(O×m), where m represents the multiple of the SCS of the SS/PBCH block relative to the SCS of the RMSI, and m may represent a fractional multiple or may represent an integral multiple.

After O_RMSI is calculated, the specific location of the RMSI detection window is calculated by using a formula O_RMSI+Window offset+x×SSB_TI.

When a value of O is based on the SCS of the SS/PBCH block, and the window offset is based on the SCS of the SS/PBCH block, a value of O+Window offset may be first transformed into the SCS of the RMSI.

When the SCS of the RMSI is greater than the SCS of the SS/PBCH block, a value obtained after transforming O+Window offset into the SCS of the RMSI is (O+Window offset)×m, where m represents a multiple of the SCS of the RMSI relative to the SCS of the SS/PBCH block.

When the SCS of the RMSI is less than the SCS of the SS/PBCH block, a value obtained after transforming O+Window offset into the SCS of the RMSI is floor((O+Window offset)/m), where m represents a multiple of the SCS of the SS/PBCH block relative to the SCS of the RMSI.

The two formulas for transforming O+Window offset may be combined into floor((O+Window offset)×m), where m represents the multiple of the SCS of the SS/PBCH block relative to the SCS of the RMSI, and m may represent a fractional multiple or may represent an integral multiple.

After floor((O+Window offset)×m) is obtained, the specific location of the RMSI detection window is calculated by using floor((O+Window offset)×m)+x×SSB_TI.

Alternatively, the starting location or the specific location of the RMSI detection window may be determined based on a maximum quantity N of detection windows transmitted in one frame.

For example, when a frame number of a frame in which the SS/PBCH burst set is located is k1, if the index of the RMSI detection window or the time index of the SS/PBCH block associated with the RMSI is greater than N, the RMSI detection window may be in a frame whose frame number is k1+1.

For example, when floor((floor((O+Window offset)×m)+x×SSB_TI)/N)=k2, the RMSI detection window may be in a frame whose frame number is k1+k2.

For example, if (floor((O+Window offset)×m)+x×SSB_TI) mod N=k3, a slot location of the RMSI monitoring window in the frame whose frame number is k1+k2 is floor((O+Window offset)×m)+k3×SSB_TI.

The following describes a case in which the reference location of the ith RMSI detection window is related to the location of the ith SS/PBCH block in the SS/PBCH burst set and the RMSI detection period is an integral multiple of the period of the SS/PBCH burst set.

When the RMSI detection period is an integral multiple of the period of the SS/PBCH burst set, the reference location of the RMSI detection window detection window may be a location of an ith SS/PBCH block in the first SS/PBCH burst set in the RMSI detection period.

Alternatively, the reference location of the RMSI detection window detection window may be a location of an ith SS/PBCH block in the SS/PBCH burst set n in the RMSI detection period.

The frame number of the reference frame or the starting frame of the RMSI detection period may be calculated by using a formula SFN mod y=k2, where y represents the RMSI detection period that is measured in a frame, a value of k2 may be fixed, for example, may be any one of 0, 1, 2, 3, 4, 5, 6, 7, 8, 9, 10, 11, 12, 13, 14, or 15, and SFN represents the frame number of the reference frame or the starting frame of the RMSI detection period.

For the manner for calculating the frame number of the reference frame or the starting frame of the period of the SS/PBCH block, refer to the manner for calculating the frame number of the reference frame or the starting frame of the RMSI detection period. Details are not described herein again.

After detecting the SS/PBCH block, the terminal device may determine the period of the SS/PBCH block based on the RMSI detection period, and then determine, based on a frame number of a frame in which the SS/PBCH block is located, a frame number of a frame in which an SS/PBCH burst set that is used as a reference of the RMSI is located, for example, determine the frame number of the first SS/PBCH burst set in the RMSI detection period as the frame number of the frame in which the SS/PBCH burst set that is used as the reference of the RMSI is located.

When the location of the ith SS/PBCH block is used as the reference location O of the ith RMSI detection window, after detecting the ith SS/PBCH block, the terminal device may determine the location of the ith RMSI detection window based on an offset of the RMSI detection window relative to the ith SS/PBCH block. The location of the ith RMSI detection window is in a QCL relationship with the ith SS/PBCH block.

The SS/PBCH block may be based on half a slot, and the RMSI detection window may be based on a slot.

A starting location of the ith RMSI monitoring window is related to an index of the associated SS/PBCH block and the duration of the detection window.

The offset of the RMSI detection window relative to the ith SS/PBCH block may be configured by using a plurality of methods. A method includes PBCH content in each SS/PBCH block is unique. A specific value of an offset of each SS/PBCH block relative to a location of an RMSI detection window that is in a QCL relationship with the SS/PBCH block is placed in the PBCH content.

A specific method for calculating the location of the RMSI detection window may be O_SSi+Time offseti, where O_SSi represents the location of the ith SS/PBCH block, and Time offseti represents a time offset of the location of the ith SS/PBCH block relative to the ith RMSI detection window.

The reference location O_SSi of the RMSI detection window may be related to the SCS of the RMSI and/or the SCS of the SS/PBCH block.

When a value of O_SSi and a value of Time offseti are based on the SCS of the RMSI, the starting location of the RMSI detection window may be directly calculated by using a formula of O_SSi+Time offseti.

When O_SSi is based on the SCS of the SS/PBCH block, and Time offseti is based on the SCS of the RMSI, the value of O_SSi may be first transformed into the SCS of the RMSI.

For example, when the SCS of the RMSI is greater than the SCS of the SS/PBCH block, a value obtained after transforming O_SSi into the SCS of the RMSI may be O_RMSIi=O_SSi×m, where m represents a multiple of the SCS of the RMSI relative to the SCS of the SS/PBCH block.

For example, when the SCS of the RMSI is less than the SCS of the SS/PBCH block, a value obtained after transforming O_SSi into the SCS of the RMSI may be O_RMSIi=floor(O_SSi/m), where m represents a multiple of the SCS of the SS/PBCH block relative to the SCS of the RMSI.

The two formulas for transforming O_SSi may be combined into O_RMSIi=floor(O_SSi×m), where m represents the multiple of the SCS of the SS/PBCH block relative to the SCS of the RMSI, and m may represent a fractional multiple or may represent an integral multiple.

The location of the RMSI detection window may be related to the index of the RMSI detection window and/or the index of the SS/PBCH block that is in a QCL relationship with the RMSI detection window. In this case, the location of the RMSI detection window may be obtained by calculating O_RMSIi+Time offseti+x×SSB_TI.

When O_SSi is based on the SCS of the RMSI, and Time offseti is based on the SCS of the SS/PBCH block, the value of Time offseti may be first transformed into the SCS of the RMSI.

For example, when the SCS of the RMSI is greater than the SCS of the SS/PBCH block, a value obtained after transforming Time offseti into the SCS of the RMSI may be TO_RMSIi=Time offseti×m, where m represents a multiple of the SCS of the RMSI relative to the SCS of the SS/PBCH block.

For example, when the SCS of the RMSI is less than the SCS of the SS/PBCH block, a value obtained after transforming Time offseti into the SCS of the RMSI may be TO_RMSIi=floor(Time offseti/m), where m represents a multiple of the SCS of the SS/PBCH block relative to the SCS of the RMSI.

The two formulas for transforming Time offseti may be combined into TO_RMSIi=floor(O_SSi×m), where m represents the multiple of the SCS of the SS/PBCH block relative to the SCS of the RMSI, and m may represent a fractional multiple or may represent an integral multiple.

When the location of the RMSI detection window may be related to the index of the RMSI detection window and/or the index of the SS/PBCH block that is in a QCL relationship with the RMSI detection window, the location of the RMSI detection window may be obtained by calculating O_SSi+TO_RMSIi+x×SSB_TI.

When O_SSi is based on the SCS of the SS/PBCH block, and Time offseti is based on the SCS of the SS/PBCH block, refer to the foregoing method to transform O_SSi and Time offseti into the SCS of the RMSI.

The following describes a case in which the RMSI detection period is greater than the period of the SS/PBCH burst set and the RMSI detection period is a fractional multiple of the period of the SS/PBCH burst set.

In this case, there may be a plurality of RMSI detection window sets in the period of the SS/PBCH burst set. These detection window sets may be associated with all SS/PBCH blocks in one SS/PBCH burst set.

If the RMSI detection period is configured for a PBCH, the period of the SS/PBCH burst set may be deduced based on a multiple relationship between the RMSI detection period and the period of the SS/PBCH burst set, and a location of the SS/PBCH burst set is further deduced. In addition, a quantity N of RMSI detection window sets in the period of the SS/PBCH burst set may be deduced.

The first detection window set in the period of the SS/PBCH burst set may be defined as a detection window set associated with the SS/PBCH burst set in the period of the SS/PBCH burst set.

For another RMSI detection window set, an offset of the another RMSI detection window set relative to the SS/PBCH burst set may be calculated based on the RMSI detection period and an index of the first detection window set in the period of the SS/PBCH burst set.

For example, the offset of the another RMSI detection window set relative to the SS/PBCH burst set may be obtained by calculating I+i×T_RMSI. I represents a location of the first detection window set in the period of the SS/PBCH burst set, and I may be a frame location, may be a half-frame location, or may be a slot location, T_RMSI represents the RMSI detection period, and i represents the index of the first detection window set in the period of the SS/PBCH burst set.

The specific location of the RMSI detection window may be determined with reference to the method for determining the location of the detection window in the various cases above.

For example, when the SS/PBCH block and the RMSI are multiplexed in a frequency division manner, a location of a frame in which the RMSI detection window is located may be calculated based on the SS/PBCH burst set.

For the specific location of the RMSI detection window, refer to the first SS/PBCH block or refer to an SS/PBCH block n, where n is an integer greater than 1.

In this embodiment of this application, the offset of the detection window may be not defined, but N starting locations are defined for the RMSI detection window.

In this case, the reference location of the RMSI detection window detection window may be referred to as the starting location of the RMSI detection window.

The starting location of the RMSI detection window may be the starting location of the first detection window. There may be a plurality of starting locations of the first RMSI detection window.

When there are two starting locations of the first RMSI detection window, the two starting locations may be respectively the first half frame and the latter half frame of the first frame in the RMSI detection period, or may be respectively the first frame and the second frame in the RMSI detection period.

Alternatively, the two starting locations may be respectively locations obtained after the first SS/PBCH block of the frame in which the SS/PBCH burst set used as a reference is located is shifted by half a frame and shifted by one frame.

The two starting locations may be indicated by using 1-bit information.

When there are four starting locations of the first RMSI detection window, the four starting locations may be respectively the first half frame and the latter half frame of the first frame in the RMSI detection period and the first half frame and the latter half frame of the second frame in the RMSI detection period.

Alternatively, the four starting locations may be respectively locations obtained after the first SS/PBCH block of the frame in which the SS/PBCH burst set used as a reference is located is shifted by half a frame, one frame, 1.5 frame, and 2 frames.

The four starting locations may be indicated by using 2 bits.

Similarly, when there are eight starting locations of the first RMSI detection window, 3 bits may be used for indication.

The method for defining N starting locations for the RMSI detection window may be applied to an FDM case, and may also be applied to a TDM case. This application sets no limitation thereto.

FIG. 7 is a schematic flowchart of an RMSI communication method according to another embodiment of this application.

S710. A network device determines, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period.

S720. The network device sends RMSI based on the location of the RMSI detection window.

The technical features of the communication method in FIG. 2 are also applicable to the communication method in FIG. 7. For brevity, details are not described herein again.

FIG. 8 is a schematic structural diagram of a terminal device according to an embodiment of this application. It should be understood that a terminal device 800 shown in FIG. 8 is merely an example. The terminal device in this embodiment of this application may further include other modules or units, or include modules having functions similar to those of modules in FIG. 8, or does not need to include all modules in FIG. 8.

The terminal device 800 may include a processor 820 and a receiver 830. Optionally, the terminal device 800 may further include a memory 810 and a transmitter 840. The memory 810 is configured to store program code and related data executed by the processor. The memory 810 may be integrated into the processor 820. The transmitter 840 may be configured to send information.

The processor 820 is configured to determine, based on offset information, a time index of an RMSI detection window corresponding to the terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period.

The receiver 830 is configured to receive the RMSI based on the location of the RMSI detection window.

Optionally, the first RMSI detection window is an RMSI detection window corresponding to a synchronization signal (SS)/physical broadcast channel (PBCH) block whose time index is 0.

Optionally, the reference location of the detection window in the RMSI detection period is determined based on the first system frame in the RMSI detection period and/or time information of the first system frame.

Optionally, the time information of the first system frame is the first subframe of the first system frame or the first slot of the first system frame.

Optionally, a reference location of a detection window set in the RMSI detection period is determined based on a location of an SS/PBCH block whose time index is 0 in an SS/PBCH burst set.

Optionally, the reference location of the RMSI detection window detection window is determined based on a location of the first SS/PBCH block in the first SS/PBCH burst set in the RMSI detection period.

Optionally, the SS/PBCH block is a candidate SS/PBCH block in the SS/PBCH burst set.

Optionally, at least two adjacent RMSI detection windows in the RMSI detection period are continuous in time.

Optionally, at least two RMSI detection windows in the RMSI detection period have same duration.

Optionally, an offset of the RMSI detection window is measured in half a frame.

The terminal device 800 can implement the operations or steps performed by the terminal device in the communication method shown in FIG. 2. Details are not described herein again.

Figure 9:
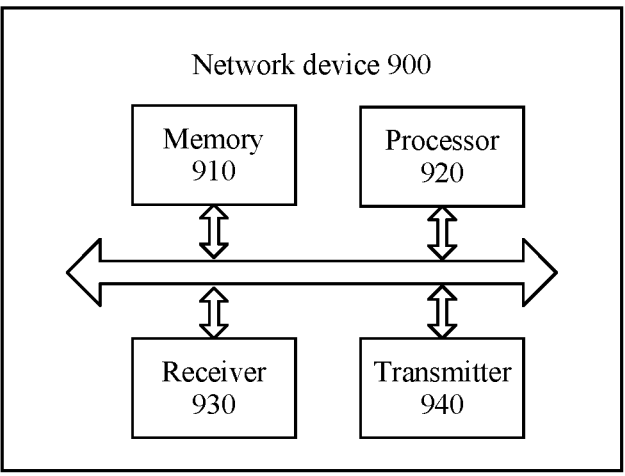
FIG. 9 is a schematic structural diagram of a network device according to an embodiment of this application.

FIG. 9 is a schematic structural diagram of a network device according to an embodiment of this application. It should be understood that a network device 900 shown in FIG. 9 is merely an example. The network device in this embodiment of this application may further include other modules or units, or include modules having functions similar to those of modules in FIG. 9, or does not need to include all modules in FIG. 9.

The network device 900 may include a processor 920 and a transmitter 940. Optionally, the network device 900 may further include a memory 910 and a receiver 930. The memory 910 is configured to store program code and related data executed by the processor. The memory 910 may be integrated into the processor 920. The receiver 930 may be configured to receive information.

The processor 920 is configured to determine, based on offset information, a time index of an RMSI detection window corresponding to a terminal device, and duration of the RMSI detection window corresponding to the terminal device, a location of the RMSI detection window corresponding to the terminal device, where the offset information is determined based on an offset between a reference location of the RMSI detection window detection window in an RMSI detection period and a first RMSI detection window in the RMSI detection period and based on the reference location of the RMSI detection window detection window in the RMSI detection period.

The transmitter 940 is configured to send the RMSI based on the location of the RMSI detection window.

Optionally, the first RMSI detection window is an RMSI detection window corresponding to a synchronization signal (SS)/physical broadcast channel (PBCH) block whose time index is 0.

Optionally, the reference location of the detection window in the RMSI detection period is determined based on the first system frame in the RMSI detection period and/or time information of the first system frame.

Optionally, the time information of the first system frame is the first subframe of the first system frame or the first slot of the first system frame.

Optionally, a reference location of a detection window set in the RMSI detection period is determined based on a location of an SS/PBCH block whose time index is 0 in an SS/PBCH burst set.

Optionally, the reference location of the RMSI detection window detection window is determined based on a location of the first SS/PBCH block in the first SS/PBCH burst set in the RMSI detection period.

Optionally, the SS/PBCH block is a candidate SS/PBCH block in the SS/PBCH burst set.

Optionally, at least two adjacent RMSI detection windows in the RMSI detection period are continuous in time.

Optionally, at least two RMSI detection windows in the RMSI detection period have same duration.

Optionally, an offset of the RMSI detection window is measured in half a frame.

The network device 900 can implement the operations or steps performed by the network device in the communication method shown in FIG. 7. Details are not described herein again.

A person of ordinary skill in the art may be aware that, units and algorithm steps in the examples described in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
at least one processor; and
at least one non-transitory memory coupled to the at least one processor, the at least one non-transitory memory storing a computer program for execution by the processor, the computer program including instructions for:
　　determining, based on offset information, and a time index of a synchronization signal (SS)/physical broadcast channel (PBCH) block, a starting location of a second physical downlink control channel (PDCCH) monitoring window of remaining minimum system information (RMSI) corresponding to the apparatus, wherein the offset information is determined based on an offset between a reference location of the second PDCCH monitoring window in an RMSI detection period and a first PDCCH monitoring window in the RMSI detection period and the reference location of the second PDCCH monitoring window in the RMSI detection period, wherein the reference location of the second PDCCH monitoring window is a beginning slot of a beginning system frame in the RMSI detection period and wherein the first PDCCH monitoring window is a PDCCH monitoring window corresponding to a SS/PBCH block whose time index is o; and
　　receiving a PDCCH within the second PDCCH monitoring window of RMSI based on the starting location of the second PDCCH monitoring window of RMSI.

2. The apparatus according to claim 1, wherein the offset is based on an indication from a network device.

3. The apparatus according to claim 1, wherein the second PDCCH monitoring window of RMSI is associated with one or more SS/PBCH blocks.

4. The apparatus according to claim 3, wherein a quantity of the SS/PBCH blocks with which the second PDCCH monitoring window of RMSI is associated is configured.

5. The apparatus according to claim 1, wherein the starting location of the first PDCCH monitoring window of RMSI is a 0 ms location or a 5 ms location of a first frame in the RMSI detection period.

6. The apparatus according to claim 1, wherein when there are at least two pieces of RMSI control information in one slot; and
wherein at least one of:
　　a first piece of RMSI control information is on the first a beginning symbol in the slot, and a second piece of RMSI control information is on a second symbol in the slot, wherein the second symbol is adjacent to the beginning symbol; or
the first piece of RMSI control information is on the beginning symbol in the slot, and the second piece of RMSI control information is on a third symbol in the slot, wherein the third symbol is adjacent to the second symbol; or
the first piece of RMSI control information is on the beginning symbol in the slot, and the second piece of RMSI control information is on the second symbol or the third symbol in the slot; or
the first piece of RMSI control information is on the beginning symbol or the second symbol in the slot, and the second piece of RMSI control information is on the third symbol in the slot.

7. The apparatus according to claim 1, wherein the RMSI detection period is fixed at 20 ms or is equal to a period of a PBCH or a multiple of the period of the PBCH.

8. The apparatus according to claim 1, wherein the offset is represented based on a slot and wherein a unit length of the offset is related to a subcarrier spacing (SCS).

9. The apparatus according to claim 1, wherein a system frame number (SFN) of a system frame in which a reference location of the second PDCCH monitoring window is located satisfies SFN mod y=k1, wherein SFN represents the frame number of the system frame in which the reference location of the second PDCCH monitoring window is located, wherein mod represents a modulo operation, wherein y represents the RMSI detection period with a unit frame, and wherein k1 is 0 or 1.

10. The apparatus according to claim 1, wherein the second PDCCH monitoring window of RMSI is determined based on the start location of the second PDCCH monitoring window of RMSI and duration of a PDCCH monitoring window of RMSI, and wherein a unit length of the duration is a slot.

11. An apparatus, comprising:
at least one processor; and
at least one non-transitory memory coupled to the at least one processor, the at least one non-transitory memory storing a computer program for execution by the processor, the computer program including instructions for:
　　determining, based on offset information, and a time index of a synchronization signal (SS)/physical broadcast channel (PBCH) block, a starting location of a second physical downlink control channel (PDCCH) monitoring window of remaining minimum system information (RMSI) corresponding to a terminal device, wherein the offset information is determined based on an offset between a reference location of the second PDCCH monitoring window in an RMSI detection period and a first PDCCH monitoring window in the RMSI detection period and the reference location of the second PDCCH monitoring window in the RMSI detection period, and wherein the reference location of the second PDCCH monitoring window is a beginning slot of a beginning system frame in the RMSI detection period and the first PDCCH monitoring window is a PDCCH monitoring window corresponding to a SS/PBCH block whose time index is 0; and
　　sending a PDCCH within the second PDCCH monitoring window of RMSI based on the starting location of the second PDCCH monitoring window of RMSI.

12. The apparatus according to claim 11, wherein the offset is indicated by the apparatus.

13. The apparatus according to claim 11, wherein the second PDCCH monitoring window of RMSI is associated with one or more SS/PBCH blocks.

14. The apparatus according to claim 13, wherein a quantity of the SS/PBCH blocks with which the second PDCCH monitoring window of RMSI is associated is configured by the apparatus.

15. The apparatus according to claim 11, wherein the starting location of the first PDCCH monitoring window of RMSI is a 0 ms location or a 5 ms location of a first frame in the RMSI detection period.

16. The apparatus according to claim 11, wherein when there are at least two pieces of RMSI control information in one slot; and wherein at least one of:

a first piece of RMSI control information is sent on a beginning symbol in the slot, and a second piece of RMSI control information is sent on a second symbol in the slot, wherein the second symbol is adjacent to the beginning symbol; or the first piece of RMSI control information is sent on the beginning symbol in the slot, and the second piece of RMSI control information is sent on a third symbol in the slot, wherein the third symbol is adjacent to the second symbol; or the first piece of RMSI control information is sent on the beginning symbol in the slot, and the second piece of RMSI control information is sent on the second symbol or the third symbol in the slot; or the first piece of RMSI control information is sent on the beginning symbol or the second symbol in the slot, and the second piece of RMSI control information is sent on the third symbol in the slot.

17. The apparatus according to claim 16, wherein the RMSI detection period is fixed at 20 ms or is equal to a period of a PBCH or a multiple of the period of the PBCH.

18. The apparatus according to claim 16, wherein the offset is represented based on a slot and wherein a unit length of the offset is related to a subcarrier spacing (SCS).

19. The apparatus according to claim 11, wherein a system frame number (SFN) of a system frame where the reference location of the second PDCCH monitoring window is located satisfies SFN mod y=k1, wherein SFN denotes the SFN of the system frame where the reference location of the second PDCCH monitoring window is located, wherein mod denotes modulo, wherein y denotes the RMSI detection period with a unit frame, and wherein k1 is 0 or 1.

20. A communication method, comprising:

determining, by a terminal device or a chip for the terminal device, based on offset information, and a time index of a synchronization signal (SS)/physical broadcast channel (PBCH) block, a starting location of a second physical downlink control channel (PDCCH) monitoring window of remaining minimum system information (RMSI) corresponding to the terminal device, wherein the offset information is determined based on an offset between a reference location of the second PDCCH monitoring window in an RMSI detection period and a first PDCCH monitoring window in the RMSI detection period and the reference location of the second PDCCH monitoring window in the RMSI detection period, wherein the reference location of the second PDCCH monitoring window is a beginning slot of a beginning system frame in the RMSI detection period and wherein the first PDCCH monitoring window being is a PDCCH monitoring window corresponding to a SS/PBCH block whose time index is 0; and receiving a PDCCH within the second PDCCH monitoring window of RMSI based on the starting location of the second PDCCH monitoring window of RMSI.

21. An apparatus, comprising:

at least one processor; and at least one memory coupled to the at least one processor, the at least one memory storing a computer program for execution by the processor, the computer program including instructions for:

determining, based on a first offset and a time index of a synchronization signal (SS)/physical broadcast channel (PBCH) block, a starting location of a physical downlink control channel (PDCCH) monitoring window of remaining minimum system information (RMSI) corresponding to a terminal device which the apparatus is or which the apparatus is for; and receiving a PDCCH within the PDCCH monitoring window of RMSI based on the starting location of the PDCCH monitoring window of RMSI;

wherein the PDCCH monitoring window of RMSI is a first PDCCH monitoring window corresponding to a SS/PBCH block with a time index being o, a first interval between the starting location of the PDCCH monitoring window of RMSI and a reference location in an RMSI detection period equals to the first offset, or, wherein the PDCCH monitoring window of RMSI is a second PDCCH monitoring window other than the first PDCCH monitoring window, a second interval between the starting location of the PDCCH monitoring window of RMSI and the reference location in the RMSI detection period is determined based on a time index of a SS/PBCH block corresponding to the second PDCCH monitoring window, the first offset and a second offset, the second offset being between any two adjacent PDCCH monitoring windows; and wherein the reference location is a fixed location in the RMSI detection period.

22. The apparatus according to claim 21, wherein the reference location in the RMSI detection period is a beginning slot of a beginning system frame in the RMSI detection period.

23. The apparatus according to claim 21, wherein the second interval equals to a sum of the first offset and N times of the second offset, N being the time index of the SS/PBCH block corresponding to the second PDCCH monitoring window and N being a positive integer.

24. The apparatus according to claim 23, wherein each PDCCH monitoring window is associated with one SS/PBCH block.

25. The apparatus according to claim 24, wherein a quantity of SS/PBCH blocks with which each PDCCH monitoring window of RMSI is associated is configured.

26. The apparatus according to claim 21, wherein the second interval equals to a sum of the first offset and X times of the second offset, X being a quotient of the time index of the SS/PBCH block corresponding to the second PDCCH monitoring window divided by a factor, wherein X is a positive integer and the factor represents a number of a SS/PBCH block corresponding to each PDCCH monitoring window.

27. The apparatus according to claim 21, wherein the second offset being a duration of each PDCCH monitoring window and any two adjacent PDCCH monitoring windows are continuous.

28. The apparatus according to claim 21, wherein the first offset is based on an indication from a network device.

29. The apparatus according to claim 21, wherein each PDCCH monitoring window of RMSI is associated with one or more SS/PBCH blocks.

30. The apparatus according to claim 21, wherein there are at least two pieces of RMSI control information in one slot; and wherein at least one of:

a first piece of RMSI control information is on a beginning symbol in the slot, and a second piece of RMSI control information is on a second symbol in the slot, wherein the second symbol is adjacent to the beginning symbol; or the first piece of RMSI control information is on the beginning symbol in the slot, and the second piece of RMSI control information is on a third symbol in the slot, wherein the third symbol is adjacent to the second symbol; or the first piece of RMSI control information is on the beginning symbol in the slot, and the second piece of RMSI control information is on the second symbol or the third symbol in the slot; or the first piece of RMSI control information is on the beginning symbol or the second symbol in the slot, and the second piece of RMSI control information is on the third symbol in the slot.

31. The apparatus according to claim 21, wherein the RMSI detection period is fixed at 20 ms or is equal to a period of a PBCH or a multiple of the period of the PBCH.

\* \* \* \* \*